US012659016B2

(12) United States Patent
Ma et al.

(10) Patent No.: US 12,659,016 B2
(45) Date of Patent: Jun. 16, 2026

(54) LOCATION INFORMATION IN NON-TERRESTRIAL NETWORKS

(71) Applicant: QUALCOMM Incorporated, San Diego, CA (US)

(72) Inventors: Liangping Ma, San Diego, CA (US); Xiao Feng Wang, San Diego, CA (US); Alberto Rico Alvarino, San Diego, CA (US); Ayan Sengupta, San Diego, CA (US); Bharat Shrestha, San Diego, CA (US); Umesh Phuyal, San Diego, CA (US); Jun Ma, San Diego, CA (US); Peter Gaal, San Diego, CA (US); Juan Montojo, San Diego, CA (US); Changhwan Park, San Diego, CA (US); Wanshi Chen, San Diego, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1116 days.

(21) Appl. No.: 17/706,018

(22) Filed: Mar. 28, 2022

(65) Prior Publication Data

US 2022/0368410 A1 Nov. 17, 2022

Related U.S. Application Data

(60) Provisional application No. 63/187,059, filed on May 11, 2021.

(51) Int. Cl.
*H04B 7/185* (2006.01)
*H04W 64/00* (2009.01)

(52) U.S. Cl.
CPC ..... *H04B 7/18513* (2013.01); *H04B 7/18519* (2013.01); *H04W 64/003* (2013.01)

(58) Field of Classification Search
None
See application file for complete search history.

(56) References Cited

U.S. PATENT DOCUMENTS

| | | | |
|---|---|---|---|
| 2021/0282193 A1* | 9/2021 | Chen | H04B 7/00 |
| 2022/0039026 A1* | 2/2022 | Sharma | H04W 52/242 |
| 2022/0086713 A1* | 3/2022 | Määttänen | H04W 36/00837 |
| 2022/0329314 A1* | 10/2022 | Liu | H04W 52/42 |
| 2023/0179294 A1* | 6/2023 | Kuang | H04B 7/2041 |
| | | | 370/316 |
| 2024/0204866 A1* | 6/2024 | Ciochina | H04B 7/1851 |

* cited by examiner

*Primary Examiner* — Srinivasa R Reddivalam
(74) *Attorney, Agent, or Firm* — Holland & Hart LLP

(57) ABSTRACT

Methods, systems, and devices for wireless communications are described. A network node and a user equipment (UE) may establish a connection between the UE and the network node of a non-terrestrial network. The UE may receive, from the network node and based on a type of orbit around Earth of the network node, a first value or the first value and a second value associated with a position or a velocity of the network node relative to a terrestrial-based reference. The UE and the network node may communicate based on the position or the velocity of the network node, or both. In some cases, the position or the velocity of the network node is based on an altitude of the network node, the first value, the second value, and a third value.

30 Claims, 16 Drawing Sheets

Communications Manager 101-a

Communications Manager 101-b

UE 115

100

115-f 120-f

705 ──Establish connection──

710 ─Partial ephemeris information─

715 — Compute velocity information

720 — UL/DL Communications

700

115-g 120-g

805    Establish connection

810    Partial ephemeris information

815    Compute position information

820    UL/DL Communications

800

910

920

915

905

900

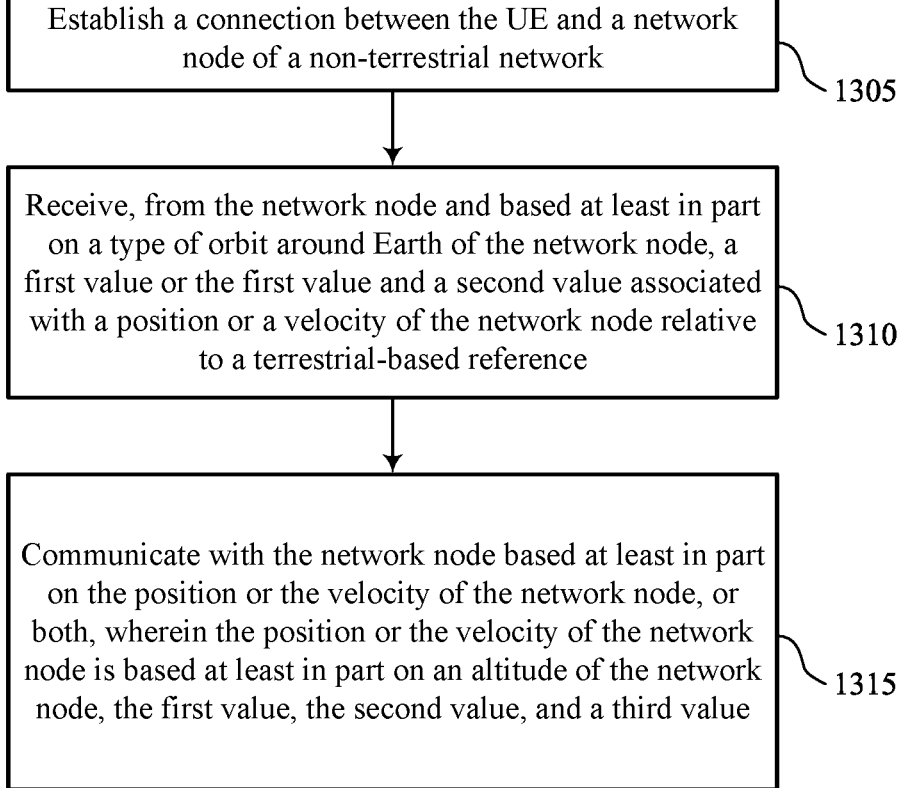

Establish a connection between the UE and a network node of a non-terrestrial network

1305

Receive, from the network node and based at least in part on a type of orbit around Earth of the network node, a first value or the first value and a second value associated with a position or a velocity of the network node relative to a terrestrial-based reference

1310

Communicate with the network node based at least in part on the position or the velocity of the network node, or both, wherein the position or the velocity of the network node is based at least in part on an altitude of the network node, the first value, the second value, and a third value

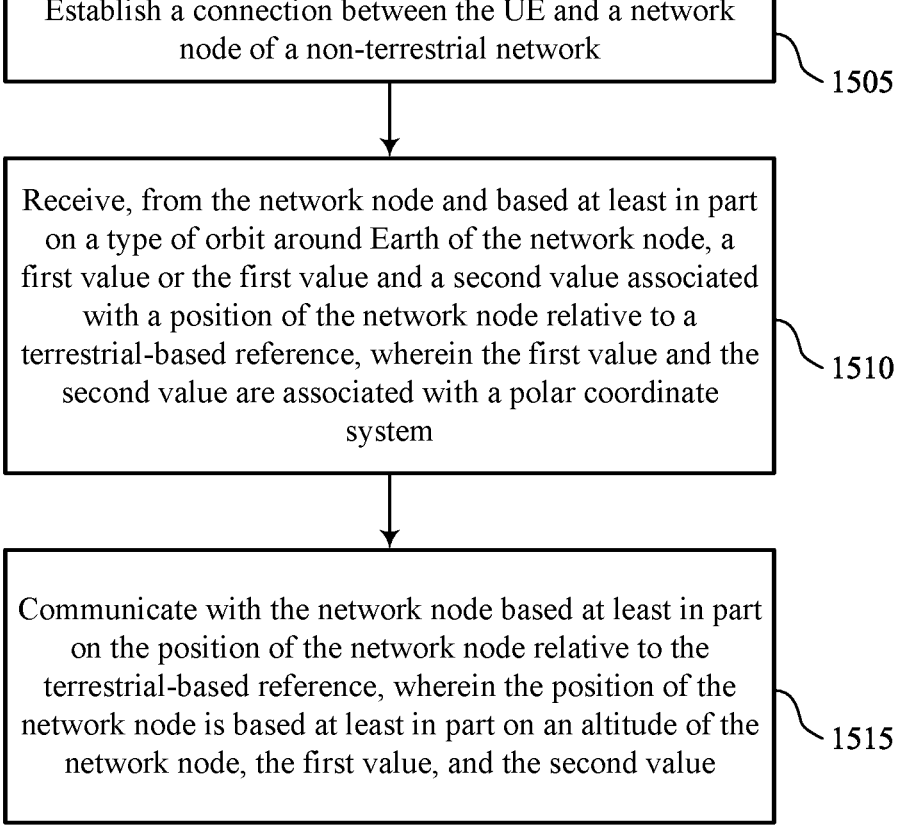

Establish a connection between the UE and a network node of a non-terrestrial network ⟍ 1505

Receive, from the network node and based at least in part on a type of orbit around Earth of the network node, a first value or the first value and a second value associated with a position of the network node relative to a terrestrial-based reference, wherein the first value and the second value are associated with a polar coordinate system ⟍ 1510

Communicate with the network node based at least in part on the position of the network node relative to the terrestrial-based reference, wherein the position of the network node is based at least in part on an altitude of the network node, the first value, and the second value ⟍ 1515

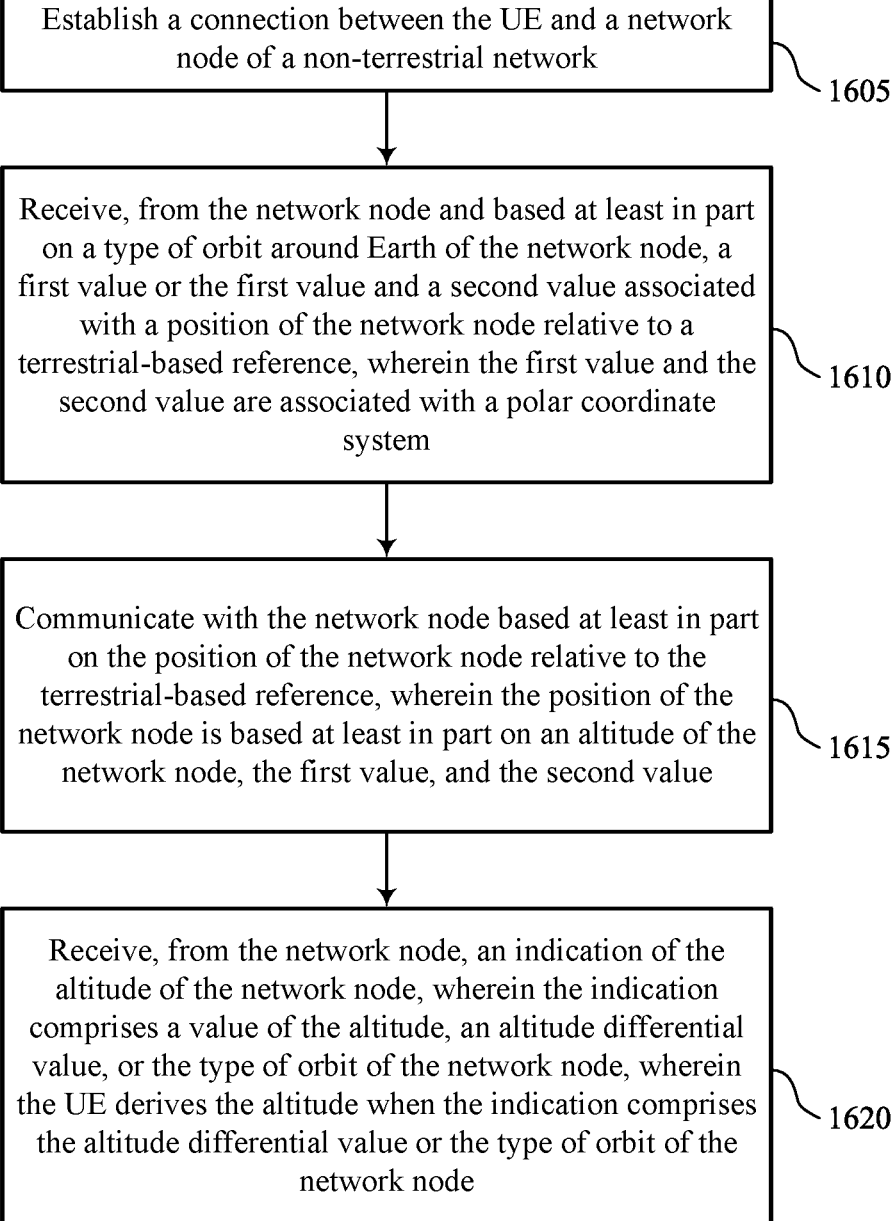

Establish a connection between the UE and a network node of a non-terrestrial network ⟍ 1605

Receive, from the network node and based at least in part on a type of orbit around Earth of the network node, a first value or the first value and a second value associated with a position of the network node relative to a terrestrial-based reference, wherein the first value and the second value are associated with a polar coordinate system ⟍ 1610

Communicate with the network node based at least in part on the position of the network node relative to the terrestrial-based reference, wherein the position of the network node is based at least in part on an altitude of the network node, the first value, and the second value ⟍ 1615

Receive, from the network node, an indication of the altitude of the network node, wherein the indication comprises a value of the altitude, an altitude differential value, or the type of orbit of the network node, wherein the UE derives the altitude when the indication comprises the altitude differential value or the type of orbit of the network node ⟍ 1620

LOCATION INFORMATION IN NON-TERRESTRIAL NETWORKS

CROSS REFERENCE

The present Application for Patent claims the benefit of U.S. Provisional Patent Application No. 63/187,059 by MA et al., entitled "LOCATION INFORMATION IN NON-TERRESTRIAL NETWORKS," filed May 11, 2021, assigned to the assignee hereof, and expressly incorporated by reference herein in its entirety.

FIELD OF TECHNOLOGY

The following relates to wireless communications, including location information in non-terrestrial networks.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, there may be a large distance between a UE and a serving node of the UE, such as when one or more of a gateway, base station, or the UE are at a high altitude relative to one another (e.g., in a non-terrestrial network (NTN) or system with high altitude platform stations (HAPSs)). Because of the relatively large distance between wireless nodes in such cases, signal strength for communications may be relatively low, and there may be a relatively long round-trip delay or propagation delay in message transmissions (e.g., relative to terrestrial networks). Further, communications in such situations may experience relatively large amounts of Doppler shift due to relatively fast movement of nodes relative to one another.

SUMMARY

The described techniques relate to improved methods, systems, devices, and apparatuses that support location information in non-terrestrial networks. Generally, the described techniques enable a network node (e.g., satellite, etc.) of a non-terrestrial network (NTN) system to provide a UE with a portion of a network node's position to enable the UE to compute the remaining portion and determine the position of the network node. Such a system may reduce an amount of signaling used to communicate the position of the network node. In some cases, the network node may transmit two coordinates (e.g., x and y) of a three-coordinate system, along with an altitude (e.g., nominal altitude) of the network node, a correction value for the third coordinate (e.g., z coordinate), and a sign of the third coordinate (e.g., the z coordinate ranging from $-z$ to $+z$). The UE then computes the third coordinate and determines the position of the network node based on the provided coordinates (e.g., x and y) and the computed coordinate (e.g., z). In some cases, the network node may transmit to the UE two angles (e.g., an azimuth angle and a zenith angle), the altitude of the network node, and a correction value for the altitude. The UE then computes the XYZ coordinates of the network node based on the provided information. In some cases, the network node may transmit two velocity vectors (e.g., $Vx$ and $Vy$) out of three velocity vectors (e.g., $Vx$, $Vy$, and $Vz$), along with the altitude of the network node, a correction value for the third velocity vector (e.g., $Vz$), and a sign of the third velocity vector (e.g., $Vz$ velocity vector ranging from $-Vz$ to $+Vz$). The UE may then compute the resultant vector (e.g., the overall vector of the network node resulting from the $Vx$, $Vy$, and $Vz$ vectors) based on the provided first and second velocity vectors ($Vx$ and $Vy$) and the computed third velocity vector ($Vz$).

A method for wireless communication at a user equipment (UE) is described. The method may include establishing a connection between the UE and a network node of a non-terrestrial network, receiving, from the network node and based on a type of orbit around Earth of the network node, a first value or the first value and a second value associated with a position or a velocity of the network node relative to a terrestrial-based reference, and communicating with the network node based on the position or the velocity of the network node, or both, where the position or the velocity of the network node is based on an altitude of the network node, the first value, the second value, and a third value.

An apparatus for wireless communication at a UE is described. The apparatus may include a processor, memory coupled with the processor, and instructions stored in the memory. The instructions may be executable by the processor to cause the apparatus to establish a connection between the UE and a network node of a non-terrestrial network, receive, from the network node and based on a type of orbit around Earth of the network node, a first value or the first value and a second value associated with a position or a velocity of the network node relative to a terrestrial-based reference, and communicate with the network node based on the position or the velocity of the network node, or both, where the position or the velocity of the network node is based on an altitude of the network node, the first value, the second value, and a third value.

Another apparatus for wireless communication at a UE is described. The apparatus may include means for establishing a connection between the UE and a network node of a non-terrestrial network, means for receiving, from the network node and based on a type of orbit around Earth of the network node, a first value or the first value and a second value associated with a position or a velocity of the network node relative to a terrestrial-based reference, and means for communicating with the network node based on the position or the velocity of the network node, or both, where the position or the velocity of the network node is based on an altitude of the network node, the first value, the second value, and a third value.

A non-transitory computer-readable medium storing code for wireless communication at a UE is described. The code may include instructions executable by a processor to establish a connection between the UE and a network node of a non-terrestrial network, receive, from the network node and based on a type of orbit around Earth of the network node, a first value or the first value and a second value associated with a position or a velocity of the network node relative to a terrestrial-based reference, and communicate with the network node based on the position or the velocity of the network node, or both, where the position or the velocity of the network node is based on an altitude of the network node, the first value, the second value, and a third value.

Some examples of the method, apparatuses, and non-transitory computer-readable medium described herein may further include operations, features, means, or instructions for receiving, from the network node, an indication of the altitude of the network node, where the indication includes a value of the altitude, an altitude differential value, or the type of orbit of the network node, where the UE derives the altitude when the indication includes the altitude differential value or the type of orbit of the network node.

Some examples of the method, apparatuses, and non-transitory computer-readable medium described herein may further include operations, features, means, or instructions for determining an absolute value of the third value based on the first value, the second value, and the altitude of the network node.

Some examples of the method, apparatuses, and non-transitory computer-readable medium described herein may further include operations, features, means, or instructions for receiving, from the network node, a correction value of the third value and a sign of the third value, determining a corrected third value based on applying the sign and the correction value of the third value to the absolute value of the third value, and determining the position of the network node relative to the terrestrial-based reference based on the first value, the second value, the corrected third value, and the altitude of the network node, where communicating with the network node may be based on the position of the network node.

Some examples of the method, apparatuses, and non-transitory computer-readable medium described herein may further include operations, features, means, or instructions for receiving, from the network node, a correction value of the altitude of the network node and a sign of the third value, applying the correction value of the altitude to the altitude of the network node, and determining the position of the network node based on applying the correction value of the altitude to the altitude of the network node.

Some examples of the method, apparatuses, and non-transitory computer-readable medium described herein may further include operations, features, means, or instructions for determining an absolute value of the third value based on the first value, the second value, and the correction value of the altitude applied to the altitude of the network node, where communicating with the network node may be based on determining the absolute value of the third value, where the first value may be of a first coordinate of the network node, the second value may be of a second coordinate of the network node, and the third value may be of a third coordinate of the network node of a three-coordinate positioning system, determining a corrected third value based on applying the sign of the third value to the absolute value of the third value, and determining the position of the network node relative to the terrestrial-based reference based on the first value, the second value, the corrected third value, and the altitude of the network node.

Some examples of the method, apparatuses, and non-transitory computer-readable medium described herein may further include operations, features, means, or instructions for receiving, from the network node, a correction value of the altitude of the network node, determining a corrected altitude based on the altitude and the correction value of the altitude, and determining the position of the network node relative to the terrestrial-based reference based on the first value, the second value, the third value, and the corrected altitude of the network node.

In some examples of the method, apparatuses, and non-transitory computer-readable medium described herein, the first value includes a first velocity vector of the network node relative to the terrestrial-based reference, the second value includes a second velocity vector of the network node relative to the terrestrial-based reference, and the third value includes a third velocity vector of the network node relative to the terrestrial-based reference.

Some examples of the method, apparatuses, and non-transitory computer-readable medium described herein may further include operations, features, means, or instructions for receiving, from the network node, a correction value of the third value and a sign of the third value and determining an absolute value of the third velocity vector based on the first velocity vector, the second velocity vector, a gravitational constant, a mass of the Earth, and the altitude of the network node.

Some examples of the method, apparatuses, and non-transitory computer-readable medium described herein may further include operations, features, means, or instructions for determining a corrected third velocity vector based on the sign, the correction value of the third value, and the absolute value of the third velocity vector, where communicating with the network node may be based on the first velocity vector, the second velocity vector, and the corrected third velocity vector.

Some examples of the method, apparatuses, and non-transitory computer-readable medium described herein may further include operations, features, means, or instructions for receiving, from the network node, a correction value of the third value and a sign of the third value and determining an absolute value of the third velocity vector based on the first velocity vector, the second velocity vector, a first satellite velocity value based on a gravitational constant, a mass of the Earth, and the altitude of the network node, and a second satellite velocity value based on an angular speed of the Earth relative to the terrestrial-based reference.

Some examples of the method, apparatuses, and non-transitory computer-readable medium described herein may further include operations, features, means, or instructions for receiving, from the network node, a radial vector of the network node, a tangent vector of the network node, and a velocity vector of the network node, determining the first velocity vector of the network node, the second velocity vector of the network node, and the third velocity vector of the network node, based on the radial vector of the network node, the tangent vector of the network node, the velocity vector of the network node, and determining a relative velocity of the network node based on the first velocity vector of the network node, the second velocity vector of the network node, and the third velocity vector of the network node, and a velocity of the UE, where communicating with the network node may be based on the relative velocity of the network node.

Some examples of the method, apparatuses, and non-transitory computer-readable medium described herein may further include operations, features, means, or instructions for receiving an indication of the type of orbit of the network node, where communicating with the network node may be based on receiving the indication of the type of orbit.

Some examples of the method, apparatuses, and non-transitory computer-readable medium described herein may further include operations, features, means, or instructions for identifying the type of orbit of the network node based on system information associated with the network node, where communicating with the network node may be based on identifying the type of orbit.

Some examples of the method, apparatuses, and non-transitory computer-readable medium described herein may further include operations, features, means, or instructions for identifying a round-trip delay between the UE and the network node and identifying the type of orbit of the network node based on the round-trip delay associated with the network node, where communicating with the network node may be based on identifying the type of orbit.

In some examples of the method, apparatuses, and non-transitory computer-readable medium described herein, the first value includes a first difference between a current first coordinate of the network node and a target first coordinate of the network node, the second value includes a second difference between a current second coordinate of the network node and a target second coordinate of the network node and the third value includes a fixed value based on the type of orbit of the network node.

Some examples of the method, apparatuses, and non-transitory computer-readable medium described herein may further include operations, features, means, or instructions for determining a first coordinate of the network node based on the first value, a second coordinate of the network node based on the second value, and a third coordinate of the network node based on the fixed value and determining the position of the network node relative to the terrestrial-based reference based on the first coordinate, the second coordinate, and the third coordinate, where communicating with the network node may be based on the position of the network node.

In some examples of the method, apparatuses, and non-transitory computer-readable medium described herein, the first value includes a first difference between the position of the network node and a second position of a reference network node, the second value includes a second difference between the position of the network node and the second position of the reference network node and the third value includes a fixed value based on the type of orbit of the network node.

Some examples of the method, apparatuses, and non-transitory computer-readable medium described herein may further include operations, features, means, or instructions for receiving information about the second position of the reference network node and receiving an indication of the reference network node associated with the first value and the second value, where communicating with the network node may be based on the receiving.

Some examples of the method, apparatuses, and non-transitory computer-readable medium described herein may further include operations, features, means, or instructions for receiving a sign of the second value, determining the second value of the network node based on the first value received from the network node, a fixed value for the third value, and the altitude of the network node, and applying the sign to the determined second value.

In some examples of the method, apparatuses, and non-transitory computer-readable medium described herein, the altitude of the network node, a reference time, and the first value or the second value, or both, may be received in one or more system information blocks or one or more radio resource control messages.

In some examples of the method, apparatuses, and non-transitory computer-readable medium described herein, the position of the network node includes an ephemeris of the network node.

In some examples of the method, apparatuses, and non-transitory computer-readable medium described herein, the first value, the second value, and the third value of the position of the network node includes geocentric coordinates of the network node in an earth-centered, earth-fixed Cartesian coordinate system.

A method for wireless communication at a UE is described. The method may include establishing a connection between the UE and a network node of a non-terrestrial network, receiving, from the network node and based on a type of orbit around Earth of the network node, a first value or the first value and a second value associated with a position of the network node relative to a terrestrial-based reference, where the first value and the second value are associated with a polar coordinate system, and communicating with the network node based on the position of the network node relative to the terrestrial-based reference, where the position of the network node is based on an altitude of the network node, the first value, and the second value.

An apparatus for wireless communication at a UE is described. The apparatus may include a processor, memory coupled with the processor, and instructions stored in the memory. The instructions may be executable by the processor to cause the apparatus to establish a connection between the UE and a network node of a non-terrestrial network, receive, from the network node and based on a type of orbit around Earth of the network node, a first value or the first value and a second value associated with a position of the network node relative to a terrestrial-based reference, where the first value and the second value are associated with a polar coordinate system, and communicate with the network node based on the position of the network node relative to the terrestrial-based reference, where the position of the network node is based on an altitude of the network node, the first value, and the second value.

Another apparatus for wireless communication at a UE is described. The apparatus may include means for establishing a connection between the UE and a network node of a non-terrestrial network, means for receiving, from the network node and based on a type of orbit around Earth of the network node, a first value or the first value and a second value associated with a position of the network node relative to a terrestrial-based reference, where the first value and the second value are associated with a polar coordinate system, and means for communicating with the network node based on the position of the network node relative to the terrestrial-based reference, where the position of the network node is based on an altitude of the network node, the first value, and the second value.

A non-transitory computer-readable medium storing code for wireless communication at a UE is described. The code may include instructions executable by a processor to establish a connection between the UE and a network node of a non-terrestrial network, receive, from the network node and based on a type of orbit around Earth of the network node, a first value or the first value and a second value associated with a position of the network node relative to a terrestrial-based reference, where the first value and the second value are associated with a polar coordinate system, and communicate with the network node based on the position of the network node relative to the terrestrial-based reference, where the position of the network node is based on an altitude of the network node, the first value, and the second value.

Some examples of the method, apparatuses, and non-transitory computer-readable medium described herein may further include operations, features, means, or instructions for receiving, from the network node, an indication of the altitude of the network node, where the indication includes a value of the altitude, an altitude differential value, or the type of orbit of the network node, where the UE derives the altitude when the indication includes the altitude differential value or the type of orbit of the network node.

In some examples of the method, apparatuses, and non-transitory computer-readable medium described herein, the first value includes a first difference between a current first angle of the network node and a first target angle of the network node and the second value includes a second difference between a current second angle of the network node and a second target angle of the network node.

Some examples of the method, apparatuses, and non-transitory computer-readable medium described herein may further include operations, features, means, or instructions for determining a first angle of the network node based on the first value and a second angle of the network node based on the second value and determining the position of the network node relative to the terrestrial-based reference based on the first angle and the second angle, where communicating with the network node may be based on the position of the network node.

Some examples of the method, apparatuses, and non-transitory computer-readable medium described herein may further include operations, features, means, or instructions for identifying the type of orbit of the network node and determining the position of the network node relative to the terrestrial-based reference based on the first value received from the network node, the second value being a fixed value based on the type of orbit of the network node, and the altitude of the network node, where communicating with the network node may be based on the position of the network node.

In some examples of the method, apparatuses, and non-transitory computer-readable medium described herein, the terrestrial-based reference includes a center of the Earth, the first value includes an azimuth angle or longitude angle of the network node relative to the center of the Earth, and the second value includes a zenith angle or latitude angle of the network node relative to the center of the Earth.

Some examples of the method, apparatuses, and non-transitory computer-readable medium described herein may further include operations, features, means, or instructions for receiving, from the network node, a correction value of the altitude of the network node, applying the correction value of the altitude to the altitude of the network node, and determining the position of the network node based on applying the correction value of the altitude to the altitude of the network node.

Some examples of the method, apparatuses, and non-transitory computer-readable medium described herein may further include operations, features, means, or instructions for receiving, from the network node, an indication of a position of a second network node.

In some examples of the method, apparatuses, and non-transitory computer-readable medium described herein, the indication of the position of the second network node includes a position of the second network node, or a velocity of the second network node, or a reference time of the second network node, or any combination thereof.

In some examples of the method, apparatuses, and non-transitory computer-readable medium described herein, the indication of the position of the second network node includes a differential position of the second network node relative to the network node, or a differential velocity of the second network node relative to the network node, or a differential reference time of the second network node relative to the network node, or any combination thereof.

In some examples of the method, apparatuses, and non-transitory computer-readable medium described herein, the indication of the position of the second network node includes a semi-major axis, or an eccentricity value, or an argument of periapsis, or a longitude of ascending node value, or an inclination value, or a mean anomaly value at an epoch time, or any combination thereof.

In some examples of the method, apparatuses, and non-transitory computer-readable medium described herein, the indication of the position of the second network node includes a differential semi-major axis, or a differential eccentricity value, or a differential argument of periapsis, or a differential longitude of ascending node value, or a differential inclination value, or a differential mean anomaly value at an epoch time, or any combination thereof.

BRIEF DESCRIPTION OF THE DRAWINGS

FIGS. 13 through 16 show flowcharts illustrating methods that support location information in non-terrestrial networks in accordance with examples as disclosed herein.

DETAILED DESCRIPTION

Figure 1:
FIG. 1 illustrates an example of a wireless communications system that supports location information in non-terrestrial networks in accordance with examples as disclosed herein.

Non-terrestrial networks (sometimes referred to as NTNs) may provide coverage by using high-altitude vehicles between user terminals and gateways or base stations (e.g., next-generation NodeBs or giga-NodeBs, which may be referred to as a gNB, and also referred to as access stations or access gateways). Examples of NTNs may include networks based on satellites, unmanned aerial vehicles, aircraft, balloons, etc. A gateway may, for example, transmit data to a satellite which may then be relayed to a user terminal or vice-versa. A high-altitude vehicle may be a base station in some examples. A user terminal may be any device capable of transmitting signals to a satellite. Examples of a user terminal may include a user equipment (UE), a relay equipment configured to relay a signal between a satellite and a user terminal, or a combination thereof. NTNs may involve the use of high altitude platform stations (HAPSs) or satellites, or both, to provide coverage for terrestrial base stations and UEs. The terms HAPS and satellite may be used interchangeably herein to refer to a remote NTN device that may provide coverage to one or more other high altitude devices or terrestrial-based devices. Likewise, the terms gateway and base station may be used interchangeably herein to refer to a network node that serves a UE and provides network access to the UE.

The gateway and the satellite may be thousands of kilometers apart and it may take some time for electromagnetic waves to propagate over the distance between the gateway and the satellite and between the satellite and the user terminal. Thus, the propagation delay for non-terrestrial networks may be many orders of magnitude larger than the propagation delay for terrestrial networks. As such, the round trip delay associated with a signal may also be orders of magnitude larger for non-terrestrial networks than for terrestrial networks. Further, due to the high mobility of high-altitude vehicles such as non-geostationary satellites, communications with the non-geostationary satellites may promote large and time-varying round trip delays. Variations in round trip delay may cause user terminals to experience variation in uplink timing and frequency synchronization with satellites. As demand for communication efficiency increases, it may be desirable for wireless communications systems to support improved techniques for estimating and determining uplink timing that account for round trip delay as well as variation in round trip delay.

A satellite-based NTN may include one or more low earth orbit (LEO) or one or more medium earth orbit (MEO) satellites, or both. With NTNs, a satellite may be in a geostationary earth orbit (GEO) or non-geostationary earth orbit (i.e., low earth orbit and medium earth orbit), either of which may operate based on an accurate time synchronization and frequency synchronization. The time synchronization and frequency synchronization for uplink transmissions, and the maintenance of the time synchronization and frequency synchronization (e.g., when a UE is in connected mode), may depend on the accuracy of a UE's receiving up-to-date satellite ephemeris information. A UE may determine or maintain the location of a serving satellite based ephemeris information.

A satellite of an NTN system may provide ephemeris information to a UE to enable the UE to determine the location of the satellite and synchronize communications between the satellite and UE. In some systems, the satellite may provide satellite position information (e.g., XYZ Cartesian coordinates such as earth-centered, earth-fixed (ECEF) coordinate system) or velocity information (e.g., Vx, Vy, Vz) to enable the UE to determine the position of the satellite. However, sending complete satellite position information may use significant bandwidth and increases the size of associated payloads and associated latency. The present techniques enable a satellite of an NTN system to provide partial satellite position information to the UE, which information enables the UE to compute a remaining portion and determine the position of the satellite.

In some examples, the satellite transmits two coordinates (e.g., x and y) of a three-coordinate system, along with a nominal altitude of the satellite, a correction value for the z coordinate, and a sign of the z coordinate. The UE then computes the z coordinate, and determines the position of the satellite based on the provided coordinates (x and y) and the computed coordinate (z).

In some examples, the satellite transmits two angles (e.g., an azimuth angle and a zenith angle), the nominal altitude of the satellite, and a correction value of altitude. Then UE then computes the XYZ coordinates of the satellite based on the provided information.

In some examples, the satellite transmits two velocity vectors (e.g., Vx and Vy) of a three-coordinate system, along with the nominal altitude of the satellite, a correction value for the Vz velocity vector, and a sign of the Vz velocity vector. The UE then computes the resultant vector based on the provided velocity vectors (Vx and Vy) and the computed velocity vector (Vz).

Aspects of the subject matter described herein may be implemented to realize one or more advantages. The described techniques may support improvements in transmissions of ephemeris information. The described techniques may result in decreasing data payload sizes associated with ephemeris information transmissions, decreasing bandwidth usage associated with ephemeris information transmissions, and decreasing latency associated with communicating ephemeris information, while enabling a UE to maintain accurate ephemeris information, thus improving user experience.

Aspects of the disclosure are initially described in the context of wireless communications systems. Aspects of the disclosure are further illustrated by and described with reference to process flows and additional wireless communications systems that relate to signaling limited ephemeris information in non-terrestrial networks. Aspects of the disclosure are further illustrated by and described with reference to apparatus diagrams, system diagrams, and flowcharts that relate to signaling limited ephemeris information in non-terrestrial networks.

FIG. 1 illustrates an example of a wireless communications system 100 that supports location information in non-terrestrial networks in accordance with examples as disclosed herein. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links (e.g., via an S1, N2, N3, or other interface). The base stations 105 may communicate with one another over the backhaul links (e.g., via an X2, Xn, or other interface) either directly (e.g., directly between base stations 105), or indirectly (e.g., via core network 130), or both. In some examples, the backhaul links may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands (e.g., in the range of 300 megahertz (MHz) to 300 gigahertz (GHz)). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels. The wireless communications system 100 includes base stations 105, UEs 115, satellites 120, and a core network 130. In some examples, the wireless communications system 100 may be an LTE network, an LTE-A network, an LTE-A Pro network, or a NR network. In some cases, wireless communications system 100 may support enhanced broadband communications, ultra-reliable (e.g., mission critical) communications, low latency communications, or communications with low-cost and low-complexity devices.

Wireless communications system 100 may also include one or more satellites 120. Satellite 120 may communicate with base stations 105 (also referred to as gateways in NTNs) and UEs 115 (or other high altitude or terrestrial communications devices). Satellite 120 may be any suitable type of communication satellite configured to relay communications between different end nodes in a wireless communication system. Satellite 120 may be an example of a space satellite, a balloon, a dirigible, an airplane, a drone, an unmanned aerial vehicle, and the like. In some examples, satellite 120 may be in a geosynchronous or geostationary earth orbit, a low earth orbit or a medium earth orbit. A satellite 120 may be a multi-beam satellite configured to provide service for multiple service beam coverage areas in a defined geographical service area. The satellite 120 may be any distance away from the surface of the earth.

In some cases, a cell may be provided or established by a satellite 120 as part of an NTN. A satellite 120 may, in some cases, perform the functions of a base station 105, act as a bent-pipe satellite, or may act as a regenerative satellite, or a combination thereof. In other cases, satellite 120 may be an example of a smart satellite, or a satellite with intelligence. For example, a smart satellite may be configured to perform more functions than a regenerative satellite (e.g., may be configured to perform particular algorithms beyond those used in regenerative satellites, to be reprogrammed, etc.). A bent-pipe transponder or satellite may be configured to receive signals from ground stations and transmit those signals to different ground stations. In some cases, a bent-pipe transponder or satellite may amplify signals or shift from uplink frequencies to downlink frequencies. A regenerative transponder or satellite may be configured to relay signals like the bent-pipe transponder or satellite, but may also use on-board processing to perform other functions. Examples of these other functions may include demodulating a received signal, decoding a received signal, re-encoding a signal to be transmitted, modulating the signal to be transmitted, or a combination thereof. For example, a bent-pipe satellite (e.g., satellite 120) may receive a signal from a base station 105 and may relay the signal to a UE 115 or base station 105, or vice-versa.

The UEs 115 and the base stations 105/satellites 120 may support communications to enable synchronization recovery in a non-terrestrial network. In various examples, a communications manager 101 may be included in a respective device to support synchronization recovery in a non-terrestrial network. In some cases, a UE 115 may include a communications manager 101 (e.g., communications manager 101-*a*). Additionally, or alternatively, a base station 105 may include a communications manager 101. In some cases, an NTN device (e.g., satellite 120) may include a communications manager 101 (e.g., communications manager 101-*b*).

In some examples, a communications manager 101 may enable a satellite 120 to provide a UE 115 with a portion of position information associated with satellite 120, and enable the UE 115 to compute the remaining portion of position information and combine the provided position information and computed position information to determine the position of satellite 120. In some cases, satellite 120 may transmit two coordinates (e.g., x and y) of a three-coordinate system, along with the altitude of satellite 120, a correction value for the third coordinate (e.g., z coordinate), and a sign of the third coordinate (e.g., a plus sign or a negative sign based on the position of satellite 120 relative to the center of the Earth). The UE 115 may then compute the third coordinate and determine the position of satellite 120 based on the coordinates provided by satellite 120 (e.g., first coordinate x and second coordinate y) and the third coordinate computed by UE 115 (e.g., third coordinate z). In some cases, satellite 120 may transmit to UE 115 two angles (e.g., an azimuth angle and a zenith angle relative to the center of the Earth), the altitude of satellite 120, and a correction value for the altitude. UE 115 may then compute the XYZ coordinates of satellite 120 based on the two angles, the altitude of satellite 120, and the correction value for the altitude. In some cases, satellite 120 may transmit two velocity vectors (e.g., Vx and Vy) out of three velocity vectors (e.g., Vx, Vy, and Vz), along with the altitude of satellite 120, a correction value for the third velocity vector (e.g., Vz), and a sign of the third velocity vector (e.g., a plus sign or a negative sign based on the velocity of satellite 120 relative to the center of the Earth). The UE may then compute the resultant vector (e.g., the overall vector of satellite 120 resulting from the Vx, Vy, and Vz vectors) based on the provided first and second velocity vectors (Vx and Vy) and the computed third velocity vector (Vz).

Described techniques may result in the wireless communications system 100 decreasing data payload sizes of ephemeris information transmissions between satellite 120 and UE 115, decreasing bandwidth usage of ephemeris information transmissions between satellite 120 and UE 115, and decreasing latency associated with communicating ephemeris information between satellite 120 and UE 115, thus improving the reliability of NTN-related transmissions and improving user experience.

Figure 2:
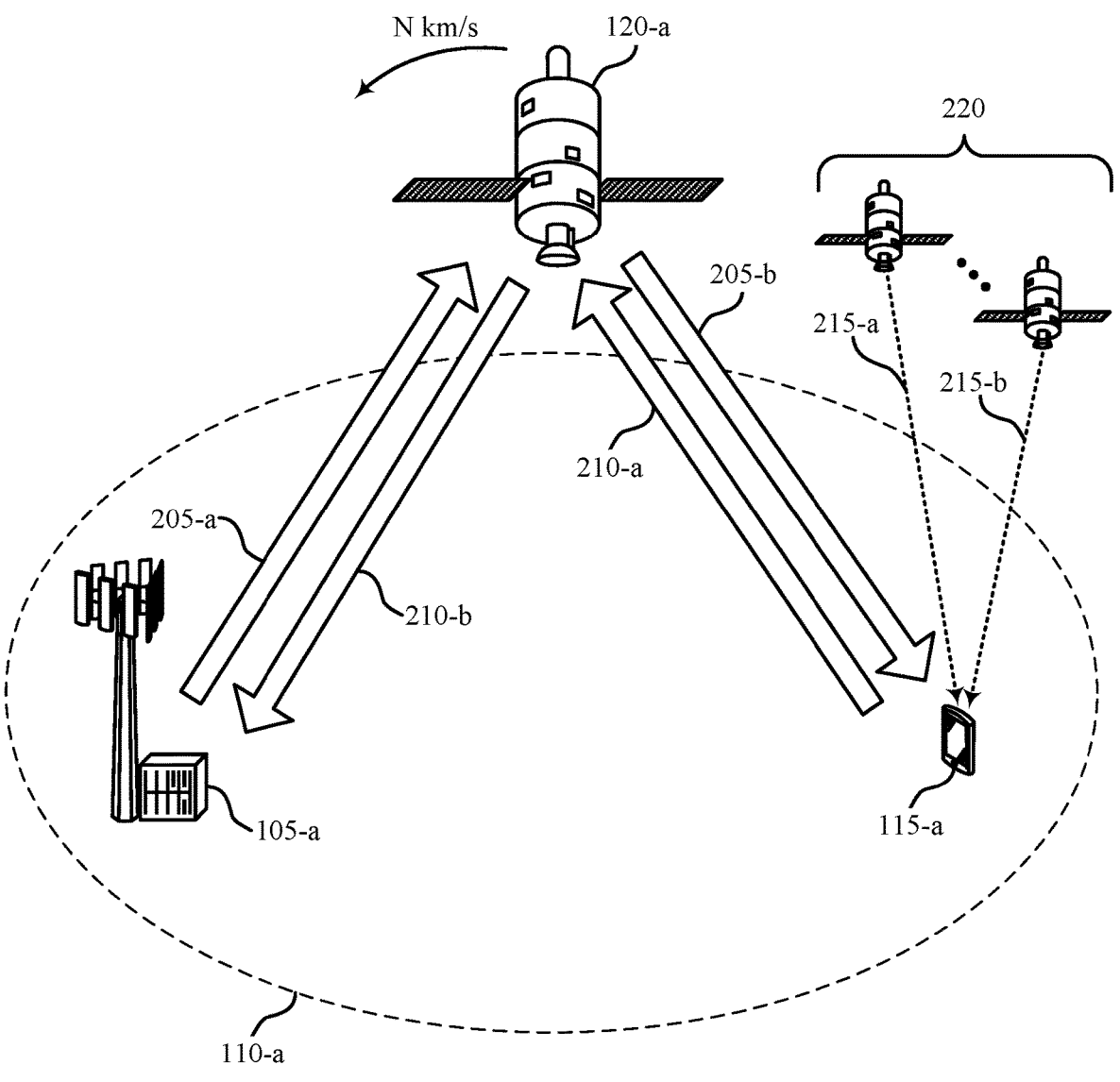
FIG. 2 illustrates an example of a wireless communications system that supports location information in non-terrestrial networks in accordance with examples as disclosed herein.

FIG. 2 illustrates an example of a wireless communications system 200 that supports location information in non-terrestrial networks in accordance with examples as disclosed herein. In some examples, wireless communications system 200 may implement aspects of wireless communications system 100. Wireless communications system 200 may include a UE 115-*a*, a satellite 120-*a*, and an auxiliary satellite system 220, which may be examples of a base station 105, UEs 115, and satellites 120 as described with reference to FIG. 1. The satellite 120-*a* may serve a coverage area 110-*a* in cases of an NTN. In some cases, satellite 120-*a* may be referred to as a serving satellite or as a base station. In some cases, auxiliary satellite system 220 may include one or more satellites (e.g., a network of positioning satellites). In some cases, UE 115-*a* may acquire a global navigation satellite system fix via one or more auxiliary satellites of auxiliary satellite system 220. In some cases, UE 115-*a* may acquire a global navigation satellite system fix via positioning signals 215.

The wireless communications system 200 may support transmissions between the UE 115-*a* and satellite 120-*a*. Satellite 120-*a* may use downlink 205-*b* to convey control or data information, or both, to UE 115-*a*. And UE 115-*a* may use uplink 210-*a* to convey control or data information, or both, to satellite 120-*a*. In some cases, base station 105-*a* may use downlink 205-*a* to convey control or data information, or both, to UE 115-*a* via satellite 120-*a*. And UE 115-*a* may use uplink 210-*a* to convey control or data information, or both, to base station 105-*a* via satellite 120-*a*.

In some cases, satellite 120-*a* may be in an orbit, such as a geostationary earth orbit or non-geostationary earth orbit (e.g., low earth orbit, medium earth orbit). In any of these examples, satellite 120-*a* may be some distance from Earth (e.g., hundreds or thousands of kilometers from Earth), and therefore may be at least the same distance from the UE 115-*a*. Each communication (e.g., of downlink 205, uplink 210) between satellite 120-*a* and UE 115-*a*, or between satellite 120-*a* and base station 105-*a*, may therefore travel from Earth the distance to satellite 120-*a* and back to Earth.

In some examples, UE 115-*a* may include an antenna configured to receive positioning signals 215 (e.g., positioning signal 215-*a*, positioning signal 215-*b*) transmitted by one or more auxiliary satellites of auxiliary satellite system 220. For example, UE 115-*a* may be configured to receive positioning signals 215 from a global navigation satellite system (GNSS) (e.g., GPS, GLONASS, etc.). Additionally, or alternatively, UE 115-*a* may be configured to receive positioning signals 215 from another system, such as an airplane positioning system, a drone positioning system, an unmanned aerial vehicle positioning system, a balloon positioning system, a dirigible positioning system, a land-based positioning system (e.g., triangulation of signals from base stations, wireless access points, etc.), a local positioning system, or a combination thereof transmitting signals that may be used to determine the position of a receiving device (e.g., UE 115-*a*).

The satellite 120-*a* may move or travel relative to fixed positions on Earth (e.g., move relative to terrestrial tracking areas). For example, when satellite 120-*a* is in a low-earth orbit, satellite 120-*a* may be between 600 km to 2000 km from Earth and travelling at a rate of N km/s, where N is a positive integer relative to point on the surface of the Earth. Therefore, satellite 120-*a* and coverage area 110-*a* served by satellite 120-*a* may move relative to Earth over time. Accordingly, UE 115-*a* may be located within and served by varying cells making up the coverage area 110-*a* of the satellite over time as satellite 120-*a* moves relative to UE 115-*a*. For example, in cases where UE 115-*a* remains in a fixed location within a given terrestrial tracking area, UE 115-*a* may experience changing cell coverage as satellite 120-*a*, coverage area 110-*a*, and cells of the coverage area 110-*a* move relative to UE 115-*a* over time. Accordingly, the wireless communications system 200 may be configured to support transmissions between the UE 115-*a* and satellite 120-*a* to address these issues.

In some examples, UE 115-*a* may establish a connection with satellite 120-*a*. In some cases, satellite 120-*a* may provide ephemeris information to UE 115-*a*. Ephemeris information may include position, velocity, or trajectory information about an astronomical object, such as a satellite orbiting Earth, or any combination thereof. In some cases, the ephemeris information may include one or more coordinates of satellite 120-*a*, or a correction value of a coordinate, or a sign (+/−) of a coordinate, or one or more velocity vectors of satellite 120-*a*, or a correction value of a velocity, or an altitude of satellite 120-*a*, or a correction value of the altitude, or a maximum altitude, or a minimum altitude, or one or more angles indicative of a position of satellite 120-*a*, or a reference time of satellite 120-*a*, or a reference time of a second satellite (e.g., of auxiliary satellite system 220), or a reference coordinate relative to the second satellite, or a reference velocity relative to the second satellite, or any combination thereof. In some cases, satellite 120-*a* may transmit the ephemeris information via one or more system information block messages, or via one or more radio resource control messages, or any combination thereof.

In some examples, the position or velocity of satellite 120-*a* may be based on an earth-centered, earth-fixed (e.g., ECEF) Cartesian coordinate system where a position is represented as x, y, and z coordinates, where the origin (x=0, y=0, z=0) is defined as the center of mass of Earth, hence geocentric coordinates. In some cases, UE 115-*a* may communicate with satellite 120-*a* based on the position or the velocity of satellite 120-*a*, or both, relative to the terrestrial-based reference. In some cases, the position or the velocity of satellite 120-*a* is based on an altitude of satellite 120-*a*, the first value, the second value, and a third value.

Communicating the position or velocity of the satellite 120-*a* may be a relatively large amount of information to communicate. For example, transmitting three values of an ECEF position coordinate and three values of an ECEF velocity vector with a sufficient resolution to be used by the UE may take 150 or more bits. There may be advantages to reducing the quantity of bits used to communicate position or velocity of the satellite 120-*a* while mitigating a loss of information that can accompany information compression or information reduction techniques.

An example of a technique for compressing the ephemeris information associated with the satellite would be to refrain from transmitting one or more values and having the UE calculate the missing value. For example, if the UE knows the altitude of the satellite and two of the three values of a coordinate, the UE may be configured to determine the third value of the coordinate. In some cases, there may be some discrepancies between an altitude known by the UE and the actual altitude of the satellite. In such cases, the satellite may communicate a correction value or a sign value, or both, to help make the UE's calculations of the remaining value more accurate. In cases of geostationary earth orbit, one of the values of the coordinate or velocity may be known because of the nature of a geostationary earth orbit (GEO) orbit. For example, any object in a GEO orbit is orbiting around the equator of the Earth at an altitude within a relatively tight range. In such situations, a satellite may transmit even fewer values (e.g., one value of a coordinate or a vector) because one of the values is fixed and known, which leaves just one value for the UE to calculate. In some cases, the satellite may communicate differential information between the satellite and a reference object, whose position is known. For example, the satellite 120-*a* may communicate ephemeris information about its position or velocity relative to a reference satellite. Communicating the differential ephemeris information may take fewer bits than communicating the full value of the actual ephemeris information.

In some examples, UE 115-*a* may receive, from satellite 120-*a* and based on a type of orbit around Earth of satellite 120-*a*, a first value or the first value and a second value associated with a polar coordinate system. In some cases, the polar coordinate system may be associated with the position and velocity of satellite 120-*a* relative to a terrestrial-based reference. In some cases, UE 115-*a* may determine the position or velocity, or both, of satellite 120-*a* based on the first value and the second value. In some cases, UE 115-*a* may communicate with satellite 120-*a* based on the determined position of satellite 120-*a* relative to the terrestrial-based reference. In some cases, the position of satellite 120-*a* is based on an altitude of satellite 120-*a*, the first value, and the second value.

In some cases, UE 115-*a* may receive, from satellite 120-*a* and based on a type of orbit around Earth of satellite 120-*a* (e.g., geostationary orbit, low earth orbit, medium earth orbit), a first value or the first value and a second value associated with a position or a velocity of satellite 120-*a* relative to a terrestrial-based reference. When satellite 120-*a* is a geostationary satellite, UE 115-*a* may receive the first value and derive the second value based on the received first value. When satellite 120-*a* is a non-geostationary satellite, UE 115-*a* may receive the first value and the second value from satellite 120-*a*.

In some examples, UE 115-*a* may use one or more parameter constraints to determine the position or velocity of satellite 120-*a*. In some cases, UE 115-*a* may use the constraint $|x|, |y|, |z| < R + A_{max}$ to determine a position of satellite 120-*a*, where the constraint indicates the absolute value of each coordinate x, y, and z, is less than the sum of the radius of the Earth R and the maximum altitude of satellite 120-*a* $A_{max}$. Accordingly, UE 115-*a* may determine that values for each coordinate x, y, and z are within the range $[-R-A_{max}, R+A_{max}]$. In some cases, satellite 120-*a* may indicate a difference between $A_{max}$ and A to UE 115-*a*, and having $A_{max}$ and the difference, UE 115-*a* may derive the altitude of satellite 120-*a*.

When UE 115-*a* has the value of R (e.g., the radius of the Earth), the value of A (e.g., altitude of satellite 120-*a*), and two of the three coordinates (e.g., UE 115-*a* receives x and y from satellite 120-*a*, and z is unknown), then UE 115-*a* may determine the third coordinate based on the following equation: $\sqrt{x^2+y^2+z^2}=R+A$. When UE 115-*a* has the value of the gravitational constant G, the mass of the earth M, the value of R, the value of A, and two of three velocity vectors (e.g., UE 115-*a* receives Vx and Vy from satellite 120-*a*, and Vz is unknown), then UE 115-*a* may determine the third velocity vector based on the following equation:

$$\sqrt{V_x^2 + V_y^2 + V_z^2} = \sqrt{\frac{GM}{R+A}}.$$

In determining the position or velocity of satellite 120-*a*, UE 115-*a* may use a nominal value for A (e.g., altitude) to derive a base value for A, and then use a correction value for A to determine the position or velocity. In some cases, satellite 120-*a* may communicate the correction value for A to UE 115-*a*.

In some examples, satellite 120-*a* may transmit to UE 115-*a* a value of the altitude of satellite 120-*a* to enable UE 115-*a* to compute a position or velocity, or both, of satellite 120-*a*. In some cases, satellite 120-*a* may transmit an index number mapped to an index entry that indicates a value for the altitude of satellite 120-*a* (e.g., an index entry for each of 300 km, 350 km, 400 km, 600 km, 1200 km, 2000 km, 4000 km, and 35,786 km). In some cases, the table may include one or more spare entries for additional altitude values. In some cases, UE 115-*a* may derive the altitude from system information of a network associated with satellite 120-*a* (e.g., via a public land mobile network identity, tracking area code (TAC), radio area network area code (RANAC), cell identity, etc.). In some cases, UE 115-*a* may derive the altitude from the type of orbit of satellite 120-*a* (e.g., altitude for a geostationary satellite is 35,786 km).

In some examples, satellite 120-*a* may transmit to UE 115-*a* two out of three coordinates (e.g., x and y), a sign (+/−) of a third coordinate, and a correction value of the third coordinate (e.g., δz). In some cases, satellite 120-*a* may transmit an altitude of satellite 120-*a* or UE 115-*a* may use a nominal value for the altitude. In some cases, UE 115-*a* may use a constraint (e.g., $\sqrt{x^2+y^2+z^2}=R+A$) to calculate the absolute value of a base value for the third coordinate, apply the signaled sign to the base value of the third coordinate, and apply the correction value to the signed base value, resulting in the signed value of the third coordinate (e.g., corrected third coordinate).

In some examples, satellite 120-*a* may send a correction value of the altitude (δA) and a sign (+/−) of the third coordinate to UE 115-*a*. In some cases, UE 115-*a* may use a constraint (e.g., $\sqrt{x^2+y^2+z^2}=R+A+\delta A$) to calculate the absolute value of the third coordinate, and apply the signaled sign to the absolute value of the third coordinate, resulting in the signed value of the third coordinate (e.g., corrected third coordinate).

In some examples, satellite 120-*a* may transmit to UE 115-*a* two out of three velocity vectors (e.g., Vx and Vy), a sign of the third velocity vector, and a correction value of the third velocity vector (e.g., δVz). In some cases, satellite 120-*a* may transmit an altitude of satellite 120-*a* or UE 115-*a* may use a nominal value for the altitude. In some cases, UE 115-*a* may use a constraint $$\left(e.g., \sqrt{V_x^2 + V_y^2 + V_z^2} = R + A\right)$$

to calculate the absolute value of a base value for the third velocity vector, apply the signaled sign to the base value of the third velocity vector, and apply the correction value to the signed base value, resulting in the signed value of the third velocity vector (e.g., corrected third velocity vector).

In some examples, satellite 120-*a* may send a correction value of the altitude (δA) and a sign (+/−) of the third velocity vector to UE 115-*a*. In some cases, UE 115-*a* may use a constraint $$\left(e.g., \sqrt{V_x^2 + V_y^2 + V_z^2} = R + A + \delta A\right)$$

to calculate the absolute value of the third velocity vector, and apply the signaled sign to the absolute value of the third velocity vector, resulting in the signed value of the third velocity vector (e.g., corrected third velocity vector). In some cases, an encoding for Vx, Vy, or Vz may be limited to a range, e.g., $|Vx|, |Vy|,$ $$|Vz| < \sqrt{\frac{GM}{R + A_{min}}},$$

where $A_{min}$ is a minimum altitude that satellite 120-*a* may indicate to UE 115-*a* in a system information block or radio resource control message.

In some cases, for beam mobility of satellite 120-*a* and UE 115-*a*, or when satellite 120-*a* is performing a handover operation (e.g., handing UE 115-*a* to a second satellite or being handed UE 115-*a* from a second satellite), one or more parameters related to a second satellite (e.g., one or more position coordinates, one or more vector velocity values, altitude, coordinate correction value, vector velocity correction value, altitude correction value, coordinate sign, vector velocity sign, etc.) may be received by UE 115-*a* by satellite 120-*a* and one or more other satellites. In some cases, the parameters may be signaled directly or differentially. In some cases, satellite 120-*a* may transmit one or more ephemeris parameters of a second satellite to UE 115-*a*. In some cases, satellite 120-*a* may transmit one or more differential ephemeris parameters related to the second satellite to UE 115-*a* that indicate a difference between the ephemeris of satellite 120-*a* and the ephemeris of the second satellite. In some cases, satellite 120-*a* may transmit an identifier of the second satellite to UE 115-*a* to indicate a parameter is associated with the second satellite. In some cases, satellite 120-*a* may transmit an identifier of the second satellite to UE 115-*a* to indicate a parameter is associated with satellite 120-*a*. In some cases, satellite 120-*a* may transmit one or more Keplerian parameters of satellite 120-*a*, of the second satellite, or differential Keplerian parameters associated with satellite 120-*a* and the second satellite. The Keplerian parameters may include a semi-major axis, or an eccentricity value, or an argument of periapsis, or a longitude of ascending node value, or an inclination value, or a mean anomaly value at an epoch time, or any combination thereof.

Aspects of the subject matter described herein may be implemented to realize one or more advantages. The present techniques may reduce power consumption and free up processing cycles of one or more devices (e.g., battery-operated devices, UE 115-*a*, etc.) by decreasing data payload size, decreasing bandwidth usage, and decreasing latency associated with communicating ephemeris information, thus improving the one or more devices with longer battery life and improved quality of service. Additionally, described techniques may result in decreasing system latency, improving the reliability of the one or more devices and of of NTN-related transmissions, while improving user experience.

Figure 3:
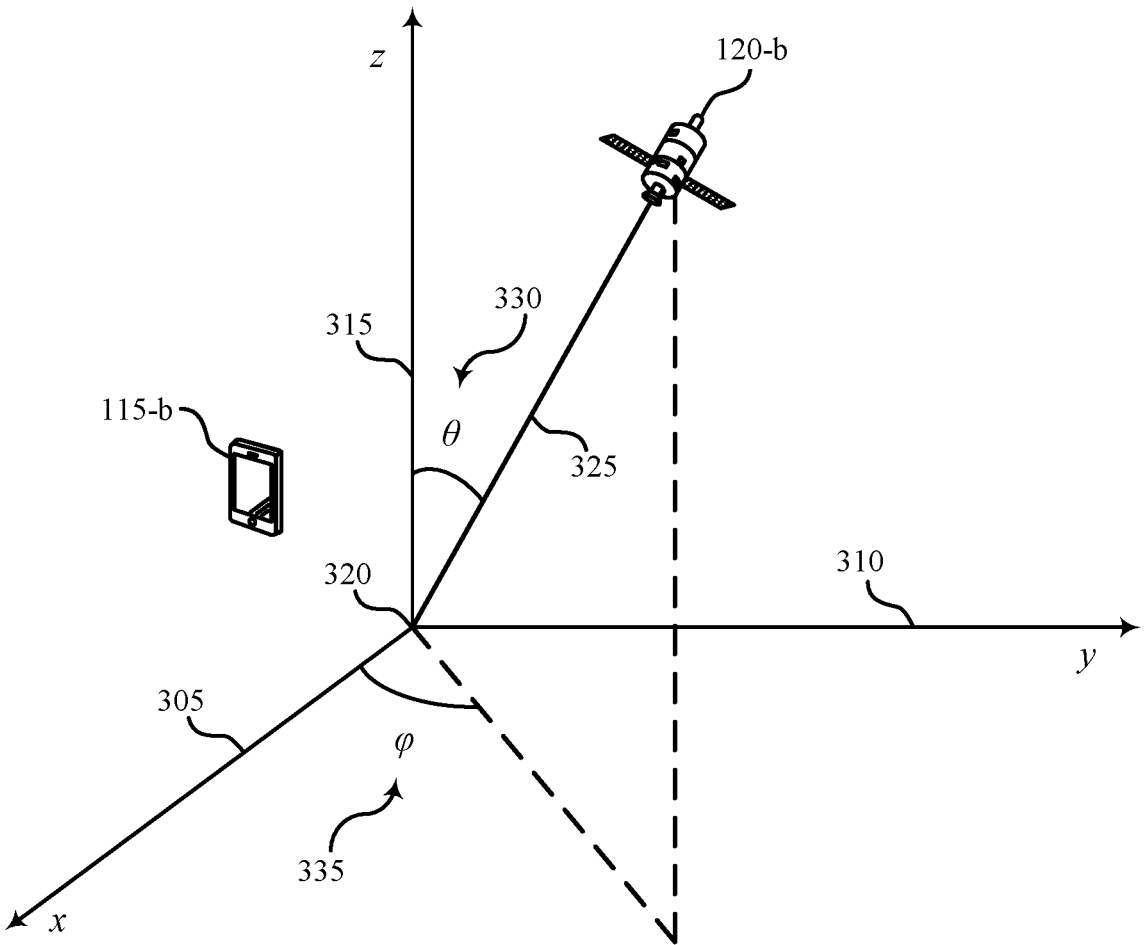
FIG. 3 illustrates an example of a wireless communications system that supports location information in non-terrestrial networks in accordance with examples as disclosed herein.

FIG. 3 illustrates an example of a wireless communications system 300 that supports location information in non-terrestrial networks in accordance with examples as disclosed herein. In some examples, wireless communications system 300 may include UE 115-*b* and satellite 120-*b*. UE 115-*b* and satellite 120-*b* may be examples of other UEs 115 and satellites 120, respectively, described herein. In some cases, UE 115-*b* may be located on the surface of the Earth or relatively near the surface of the Earth.

In the illustrated example, the position of 120-*b* may be determined relative to x axis 305 (e.g., an x coordinate along x axis 305), y axis 310 (e.g., a y coordinate along y axis 310), and z axis 315 (e.g., a z coordinate along z axis 315). In some cases, the position of satellite 120-*b* may be determined relative to a center of the Earth 320 and an altitude 325 of satellite 120-*b*. In some examples, satellite 120-*b* may indicate its position to UE 115-*b* based on a polar coordinate system. In some cases, satellite 120-*b* may transmit two angles that locate the satellite on a sphere, the origin being the center of the Earth. In some cases, satellite 120-*b* may transmit a reference time to UE 115-*b*. The two angles may include zenith angle 330 (e.g., θ, which equals 90 degrees—a latitude angle α) and azimuth angle 335 (e.g., longitude angle φ).

In some examples, in association with the two angles, satellite 120-*b* may transmit to UE 115-*b* a value of the altitude of satellite 120-*b* to enable UE 115-*b* to compute a position or velocity, or both, of satellite 120-*b* based on the two angles and the altitude of satellite 120-*b*. In some cases, satellite 120-*b* may transmit an index number mapped to an index entry that indicates a value for the altitude of satellite 120-*b* (e.g., an index entry for each of 300 km, 350 km, 400 km, 600 km, 1200 km, 2000 km, 4000 km, and 35,786 km). In some cases, the table may include one or more spare entries for additional altitude values. In some cases, UE 115-*b* may derive the altitude from system information of a network associated with satellite 120-*b* (e.g., via a public land mobile network identity, tracking area code (TAC), RAN area code (RANAC), cell identity, etc.). In some cases, UE 115-*b* may derive the altitude from the type of orbit of satellite 120-*b* (e.g., altitude for a geostationary satellite is 35,786 km).

In some examples, UE 115-*b* may compute the position of satellite 120-*b* based on the two angles that satellite 120-*b* transmits to UE 115-*b*. In some cases, UE 115-*b* may compute Cartesian coordinates based on the two angles. In some cases, UE 115-*b* may compute Cartesian coordinates based on the following equations:

$$x = (R + A + \delta A)\sin\theta \cos\varphi$$
$$y = (R + A + \delta A)\sin\theta \sin\varphi$$
$$z = (R + A + \delta A)\cos\theta$$

Figure 4:
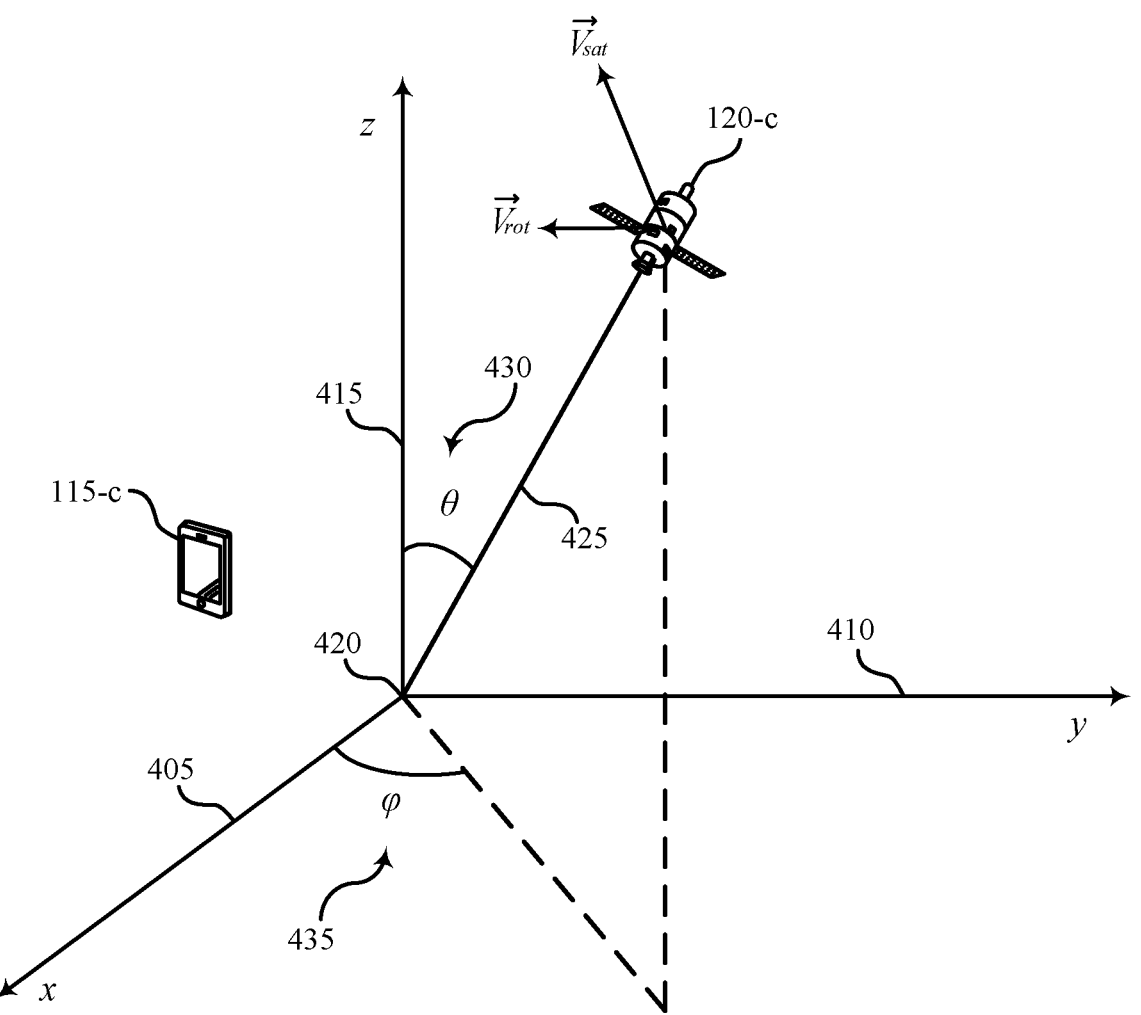
FIG. 4 illustrates an example of a wireless communications system that supports location information in non-terrestrial networks in accordance with examples as disclosed herein.

FIG. 4 illustrates an example of a wireless communications system 400 that supports location information in non-terrestrial networks in accordance with examples as disclosed herein. In some examples, wireless communications system 400 may include UE 115-*c* and satellite 120-*c*. UE 115-*c* and satellite 120-*c* may be examples of other UEs 115 and satellites 120, respectively, described herein.

In the illustrated example, the position of 120-*c* may be determined relative to x axis 405 (e.g., an x coordinate along x axis 405), y axis 410 (e.g., a y coordinate along y axis 410), and z axis 415 (e.g., a z coordinate along z axis 415). In some cases, the position of satellite 120-*c* may be determined relative to a center of the Earth 420 and an altitude 425 of satellite 120-*c*. In some examples, satellite 120-*c* may indicate its position to UE 115-*c* based on a polar coordinate system. In some cases, satellite 120-*c* may transmit two angles that locate the satellite on a sphere, the origin being the center of the Earth. In some cases, satellite 120-*c* may transmit a reference time to UE 115-*c*. The two angles may include zenith angle 430 (e.g., θ, which equals 90 degrees—a latitude angle) and azimuth angle 435 (e.g., longitude angle φ).

In some examples, satellite 120-*c* may indicate velocity information to UE 115-*c* based on an earth-centered (e.g., center of the Earth 420), earth-fixed coordinate system. In some cases, satellite 120-*c* may transmit two of three velocity vectors (e.g., Vx and Vy), a sign of the third velocity vector, an altitude of satellite 120-*c* (e.g., a nominal altitude, a base value of the altitude, etc.), and a correction value for the altitude. UE 115-*c* may then use a constraint $$\left(\text{e.g., } \sqrt{V_x^2 + V_y^2 + V_z^2} = \sqrt{\frac{GM}{R + A + \delta A}}\right)$$

to determine an absolute value of the third velocity vector, and apply the signaled sign to the absolute value of the third velocity vector, resulting in the signed value of the third velocity vector (e.g., corrected third velocity vector). In some cases, the correction value of the altitude ($\delta A$) may be selected by satellite 120-*c* to absorb the effect of the Earth's self-rotation. Related constraints that enable UE 115-*c* to determine a corrected third velocity vector that takes into account the rotation of the Earth include $$\sqrt{\frac{GM}{R + A + \delta A}} = \left|\vec{V}_{sat} + \vec{V}_{rot}\right|,$$

and by extension, $$\sqrt{V_x^2 + V_y^2 + V_z^2} = \left|\vec{V}_{sat} + \vec{V}_{rot}\right|,$$

where $\vec{V}_{sat}$ is the velocity of satellite 120-*c* in an inertial frame of reference centered at the Earth (e.g., ignoring the effect of the Earth orbiting the Sun) with the magnitude $$\left|\vec{V}_{sat}\right| = \sqrt{\frac{GM}{R + A}}$$

and the direction determined by the position of satellite 120-*c* and orbital information (e.g., orientation of the orbital plane of satellite 120-*c*), and where $\vec{V}_{rot}$ is the velocity of satellite 120-*c* in an earth-centered, earth-fixed frame of reference due to the Earth's self-rotation being based on $|\vec{V}_{rot}| = \omega(R+A) \sin \theta$ and the direction being along the East-to-West tangent at the position of satellite 120-*c* on a respective latitude circle, where $\omega$ is the angular speed of the Earth in the inertial frame of reference.

Figure 5:
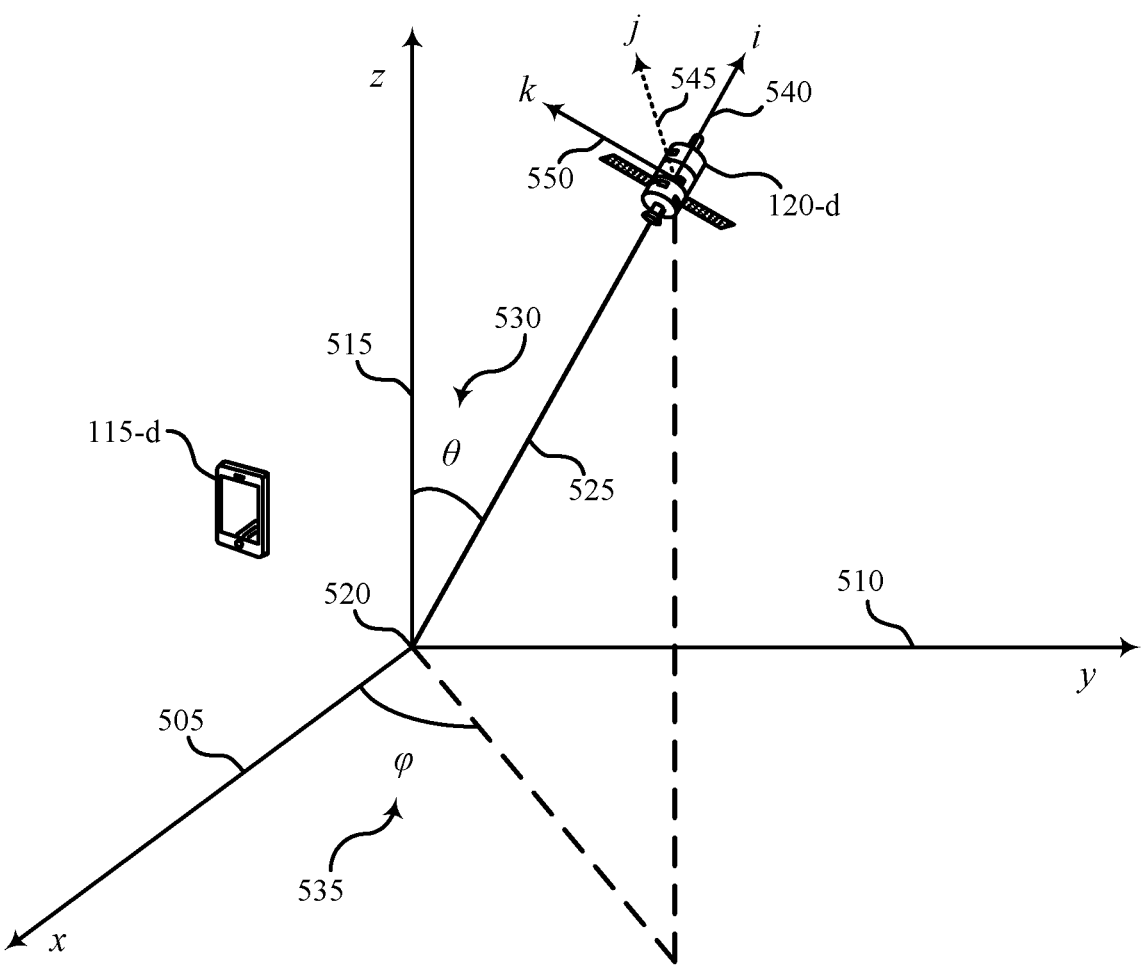
FIG. 5 illustrates an example of a wireless communications system that supports location information in non-terrestrial networks in accordance with examples as disclosed herein.

FIG. 5 illustrates an example of a wireless communications system 500 that supports location information in non-terrestrial networks in accordance with examples as disclosed herein. In some examples, wireless communications system 500 may include UE 115-*d* and satellite 120-*d*. UE 115-*d* and satellite 120-*d* may be examples of other UEs 115 and satellites 120, respectively, described herein.

In the illustrated example, the position of 120-*d* may be determined relative to x axis 505 (e.g., an x coordinate along x axis 505), y axis 510 (e.g., a y coordinate along y axis 510), and z axis 515 (e.g., a z coordinate along z axis 515). In some cases, the position of satellite 120-*d* may be determined relative to a center of the Earth 520 and an altitude 525 of satellite 120-*d*. In some examples, satellite 120-*d* may indicate its position to UE 115-*d* based on a polar coordinate system. In some cases, satellite 120-*d* may transmit two angles that locate the satellite on a sphere, the origin being the center of the Earth. In some cases, satellite 120-*d* may transmit a reference time to UE 115-*d*. The two angles may include zenith angle 530 (e.g., $\theta$, which is equal to 90 degree–latitude angle $\alpha$) and azimuth angle 535 (e.g., longitude angle $\varphi$).

In the illustrated example, instead of communicating to UE 115-*d* coordinates based on an earth-centered, earth-fixed Cartesian coordinate system (e.g., x, y, z coordinates), satellite 120-*d* may use a coordinate system based on a local satellite-centered coordinate system spanned by basis vectors i, j, and k, where the basis vector i is along the radial direction of the satellite 120-*d*, the basis vector j is on a tangent direction of a latitude circle passing of the satellite 120-*d*, and the basis vector k is determined by the right-hand rule. In some cases, a number of bits that satellite 120-*d* uses to indicate a coordinate in the axis along basis vector i may be less than the bits satellite 120-*d* uses to indicate the coordinates in the axes along basis vectors j or k because the degree of motion of satellite 120-*d* in the radial direction may be smaller than the degree of motion in the direction of j or k. In some cases, UE 115-*d* may compute the velocity vectors (Vx, Vy, and Vz) based on the coordinates in the axes along basis vectors i, j, and k in the satellite-centered coordinate system.

In some examples, UE 115-*d* may compute a relative velocity of satellite 120-*d* that relates the velocity of satellite 120-*d* relative to the velocity of UE 115-*d* as follows: $\vec{V}_{rel} = \vec{V}_{PVT} - \vec{V}_{UE}$, where $\vec{V}_{PVT} = \vec{V}_{sat} + \vec{V}_{rot}$, and $\vec{V}_{UE}$ are the velocity of satellite 120-*d* and UE 115-*d*, respectively, in the earth-centered, earth-fixed coordinate system. In some cases, UE 115-*d* may use the relative velocity for Doppler frequency compensation when communicating with satellite 120-*d*.

In some examples, satellite 120-*c* may communicate a first set of ephemeris information when satellite 120-*c* is in a geostationary earth orbit and may communicate a second set of ephemeris information when satellite 120-*c* is in a non-geostationary earth orbit (e.g., low earth orbit, medium earth orbit). In some cases, the first set of ephemeris information may include different information, less information, or more information than the second set of ephemeris information.

When satellite 120-*c* is in a geostationary earth orbit the position of satellite 120-*c* may vary relatively little compared to when satellite 120-*c* is in a non-geostationary earth orbit. Accordingly, a stationary target position may be used to reduce signaling for ephemeris information. When satellite 120-*c* is in a geostationary earth orbit above the equator, then the value of the z coordinate may be zero or relatively near zero. When satellite 120-*c* is in a geostationary earth orbit above the equator, then in the polar coordinate system, the latitude angle (e.g., 90 degrees—zenith angle) may be fixed (e.g., 0 degrees or relatively near 0 degrees). Satellite 120-*c* may leverage these characteristics of when satellite 120-*c* is in a geostationary earth orbit to reduce the amount of signaling by two-thirds (e.g., send a value of a first coordinate in a three-coordinate system that enables UE 115-*c* to compute the values of the other two coordinates). In some aspects, a stationary target position may be an orbital slot allocated by a regulation body such as the International Telecommunication Union (ITU).

In some cases, satellite 120-*c* may signal its type of orbit (e.g., a geostationary earth orbit or a non-geostationary earth orbit such as low earth orbit or medium earth orbit). In some cases, a flag of a message (e.g., a bit value of a system information block message or a bit value of a radio resource control messages) may indicate the type of orbit. In some cases, satellite 120-*c* may derive the type of orbit from system information of a network associated with satellite 120-c (e.g., via a public land mobile network identity, tracking area code (TAC), RAN area code (RANAC), cell identity, etc.). In some cases, UE 115-a may derive the type of orbit based on a timing value (e.g., a round trip delay between UE 115-c and satellite 120-c).

In some examples, satellite 120-c may communicate a position of satellite 120-c to UE 115-c based on a target position using Cartesian coordinates (e.g., $x_0$, $y_0$, $z_0$). In some cases, satellite 120-c may indicate $x_0$ and a sign (+/−) for $y_0$, and UE 115-c may assume a value for $z_0$ (e.g., $z_0$=0). In some cases, UE 115-c may use a geo-specific constraint $$\left(\text{e.g., } \sqrt{x_0^2 + y_0^2} = R + A_{GEO}\right)$$

to derive $y_0$, where $A_{GEO}$ is the altitude of satellite 120-c in a geostationary earth orbit. In some cases, satellite 120-c may indicate $y_0$ and a sign (+/−) for $x_0$, and UE 115-c may use the geo-specific constraint to derive $x_0$.

In some examples, satellite 120-c may communicate to UE 115-c values for $x_0$ and $y_0$, and UE 115-c may assume a fixed value for $z_0$ (e.g., $z_0$=0). In some cases, satellite 120-c may communicate a difference (e.g., a deviation from a respective target position) for at least two out three of the target values (e.g., two out of $\delta x$, $\delta y$, and $\delta z$). In some cases, satellite 120-c may signal the differences more frequently than the full values of the respective target position. In some cases, the UE may calculate x=x0+$\delta x$, y=y0+$\delta y$, z=$\delta z$.

When satellite 120-c is in a geostationary earth orbit, may communicate a position of satellite 120-c to UE 115-c a target position using polar coordinate (e.g., $\varphi_0$, $\delta_0$,$A_0$). In some cases, UE 115-c may assume a fixed value for zenith angle 330 (e.g., longitude angle $\theta_0$=90 degrees) and determine the base value of azimuth angle 335 based on the fixed value of zenith angle 330 and the altitude of satellite 120-c. In some cases, angle values may be quantized at a given step size such as 0.1 degrees, or 0.01 degrees, etc. In some cases, satellite 120-c may communicate a difference (e.g., deviations from the target position $\delta\varphi$, $\delta\theta$, $\delta A$) more frequently than full angle values. Thus, UE 115-c may compute azimuth angle 335 as follows: $\varphi=\varphi_0+\delta\varphi$, and compute zenith angle 330 as follows: $\theta=\theta_0+\delta\theta$. In some cases, UE may determine the Cartesian coordinates of satellite 120-c based on the following equations:

$$x = (R + A_{GEO} + \delta A)\sin\theta\cos\varphi$$

$$y = (R + A_{GEO} + \delta A)\sin\theta\sin\varphi$$

$$z = (R + A_{GEO} + \delta A)\cos\theta$$

In some cases, a latitude angle $\alpha$ may be used in place of the zenith angle $\theta$, where the latitude angle and the zenith angle sum to 90 degree, where $\cos\theta$ changes to $\sin\alpha$, and $\sin\theta$ changes to $\cos\alpha$ in the above equations. In some cases, the fixed value for the latitude angle $\alpha_0$ may be assumed to be 0 by the UE.

In some cases, satellite 120-c may not communicate $\delta\theta$, $\delta\varphi$, $\delta A$, and UE 115-c may assume a value of zero for each of $\delta\theta$, $\delta\varphi$, $\delta A$ in the equations for x, y, and z above.

When satellite 120-c is in a geostationary earth orbit, the number of bits (N) that satellite 120-c uses to indicate its velocity may be less than the number of bits (M) that for other types of orbits (e.g., N≤M). When satellite 120-c is in a geostationary earth orbit, satellite 120-c may use N bits to signal any one of the velocity vectors Vx, Vy and Vz to UE 115-c in the earth-centered, earth-fixed Cartesian coordinate system, or to signal any one of the velocity vectors Vi, Vj and Vk satellite-centered coordinate system.

When satellite 120-c is in a geostationary earth orbit, satellite 120-c may not signal velocity vectors Vx, Vy and Vz (or velocity vectors Vi, Vj and Vk) and may be assumed to be zero by UE 115-c. When satellite 120-c is in a non-geostationary earth orbit, satellite 120-c may use M bits to communicate any one of velocity vectors Vx, Vy and Vz or Vi, Vj and Vk, where M≥N.

When satellite 120-c is not in a geostationary orbit, satellite 120-c may send two position coordinates (e.g., x and y) out of three coordinates as described herein to compute the third coordinate. When satellite 120-c is not in a geostationary orbit, satellite 120-c may send two position velocity vectors (e.g., Vx and Vy) out of three velocity vectors as described herein to compute the third velocity vector. When satellite 120-c is not in a geostationary orbit, satellite 120-c may send two angles (e.g., zenith angle 330 and azimuth angle 335) to enable UE 115-c to determine the position of satellite 120-c.

Figure 6:
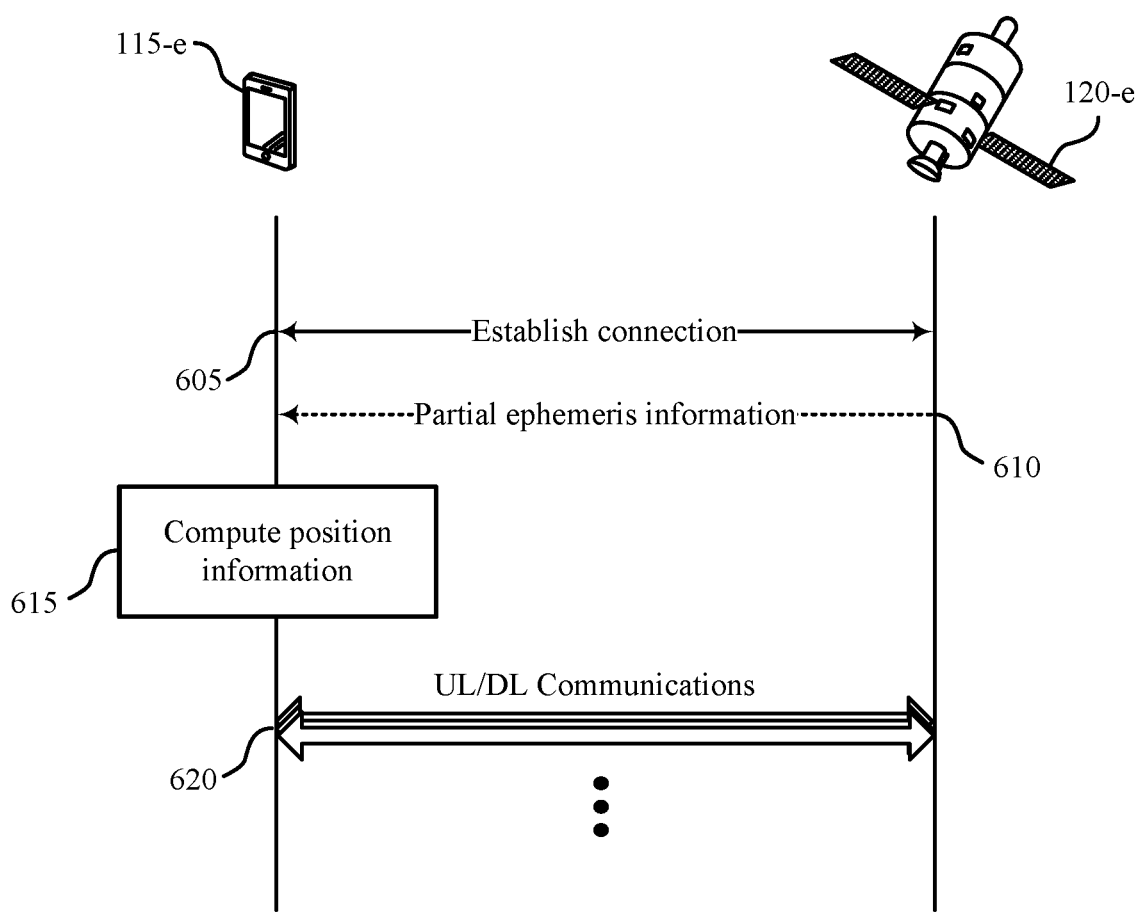
FIG. 6 illustrates an example of a process flow that supports location information in non-terrestrial networks in accordance with examples as disclosed herein.

FIG. 6 illustrates an example of a process flow 600 that supports location information in non-terrestrial networks in accordance with examples as disclosed herein.

At 605, UE 115-e may establish a connection with a network node of a non-terrestrial network (e.g., satellite 120-e). In some cases, UE 115-e may communicate control information or data, or both, to satellite 120-e based on the established connection. In some cases, UE 115-e may receive control information or data, or both, from satellite 120-e based on the established connection. In some cases, establishing the connection may include satellite 120-e sending ephemeris information (e.g., partial ephemeris information) to UE 115-e to enable UE 115-e to determine the position of satellite 120-e. In some cases, the position of satellite 120-e may include an ephemeris of satellite 120-e.

At 610, satellite 120-e may transmit partial ephemeris information to UE 115-e. The partial ephemeris information may include a first value or the first value and a second value that are associated with a position of satellite 120-e relative to a terrestrial-based reference (e.g., the center of the Earth). In some cases, UE 115-e may receive the first value or the first value and the second value based on a type of orbit around Earth of satellite 120-e. In some cases, UE 115-e may receive the first value (e.g., only the first value) when the type of orbit around Earth of satellite 120-e is a geostationary earth orbit. In some cases, UE 115-e may receive the first value and the second value when the type of orbit around Earth of satellite 120-e is a non-geostationary earth orbit (i.e., low earth orbit or medium earth orbit). In some cases, the partial ephemeris information may include an indication of the type of orbit of satellite 120-e. In some cases, communicating with satellite 120-e may be based on receiving the indication of the type of orbit.

In some cases, UE 115-e may receive the partial ephemeris information in one or more messages sent at one or more time periods. In some cases, at least one of the one or more messages may include an indication of the altitude of satellite 120-e. In some cases, the indication may include a value of the altitude, an altitude differential value, or the type of orbit of satellite 120-e. In some cases, UE 115-e may derive the altitude when the indication includes the altitude differential value or the type of orbit of satellite 120-e. In some cases, at least one of the one or more messages may include a correction value of the altitude of satellite 120-e.

In some cases, at least one of the one or more messages may include a correction value of a third value associated with the first value and the second value. In some cases, at least one of the one or more messages may include a sign (e.g., +/−) of the third value.

In some cases, the partial ephemeris information may include a sign of the second value. In some cases, the partial ephemeris information may include the altitude of satellite 120-e, or an indication of the altitude of satellite 120-e, or a reference time of satellite 120-e, or the first value, or the second value, or any combination thereof. In some cases, at least a portion of the partial ephemeris information may be received in one or more system information blocks or one or more radio resource control messages, or any combination thereof.

In some cases, the partial ephemeris information may include information about a reference network node (e.g., a second satellite different from satellite 120-e). In some cases, the first value may include a first difference between the position of satellite 120-e and a position of the reference network node. In some cases, the second value may include a second difference between the position of satellite 120-e and the position of the reference network node. In some cases, the third value may include a fixed value based on the type of orbit of satellite 120-e. In some cases, the partial ephemeris information may include the position of the reference network node and an indication of the reference network node associated with the first value and the second value.

At 615, UE 115-e may compute a position of satellite 120-e based on the partial ephemeris information that UE 115-e receives from satellite 120-e. In some cases, UE 115-e may determine the third value based on the partial ephemeris information. In some cases, the first value, the second value, and the third value may be associated with coordinates (e.g., coordinates of satellite 120-e in relation to a Cartesian three-coordinate positioning system). In some cases, the first value, the second value, and the third value of the position of satellite 120-e may include geocentric coordinates of satellite 120-e in an earth-centered, earth-fixed Cartesian coordinate system.

In some examples, in computing a position of satellite 120-e, UE 115-e may determine an absolute value of the third value based on the first value, the second value, and the altitude of satellite 120-e. In some cases, in computing a position of satellite 120-e, UE 115-e may determine a corrected third value based on applying the sign and the correction value of the third value to the absolute value of the third value. In some cases, UE 115-e may determine the position of satellite 120-e relative to the terrestrial-based reference based on the first value, the second value, the corrected third value, and the altitude of satellite 120-e. In some cases, communicating with satellite 120-e is based on the position of satellite 120-e.

In some examples, in computing a position of satellite 120-e, UE 115-e may determine a corrected third value based on applying the sign of the third value to the absolute value of the third value. In some cases, UE 115-e may determine the position of satellite 120-e relative to the terrestrial-based reference based on the first value, the second value, the corrected third value, and the altitude of satellite 120-e.

In some examples, in computing a position of satellite 120-e, UE 115-e may apply the correction value of the altitude to the altitude of satellite 120-e and determine the position of satellite 120-e based on applying the correction value of the altitude to the altitude of satellite 120-e. In some cases, in computing a position of satellite 120-e, UE 115-e may determine an absolute value of the third value based on the first value, the second value, and the correction value of the altitude applied to the altitude of satellite 120-e. In some cases, in computing a position of satellite 120-e, UE 115-e may determine a corrected altitude based on the altitude and the correction value of the altitude and determine the position of satellite 120-e relative to the terrestrial-based reference based on the first value, the second value, the third value, and the corrected altitude of satellite 120-e.

In some examples, in computing a position of satellite 120-e, UE 115-e may determine the second value of satellite 120-e based on the first value received from satellite 120-e, a fixed value for the third value, and the altitude of satellite 120-e, and apply the sign to the determined second value.

In some examples, in computing a position of satellite 120-e, UE 115-e may identify the type of orbit of satellite 120-e based on system information associated with satellite 120-e. In some cases, UE 115-e may identify a round-trip delay between UE 115-e and satellite 120-e and identify the type of orbit of satellite 120-e based on the round-trip delay associated with satellite 120-e. In some cases, communicating with satellite 120-e may be based on identifying the type of orbit.

In some examples, the first value may include a first difference between a first current coordinate of satellite 120-e (e.g., current x coordinate) and a first target coordinate of satellite 120-e (e.g., target x coordinate based on a target position of satellite 120-e), the second value may include a second difference between a second current coordinate of satellite 120-e (e.g., current y coordinate) and a second target coordinate of satellite 120-e (e.g., target y coordinate), and the third value (e.g., z coordinate) may include a fixed value (e.g., z=0) based on the type of orbit of satellite 120-e.

In some examples, UE 115-e may determine a first coordinate of satellite 120-e based on the first value, a second coordinate of satellite 120-e based on the second value, and a third coordinate of satellite 120-e based on the fixed value. UE 115-e may determine the position of satellite 120-e relative to the terrestrial-based reference based on the first coordinate, the second coordinate, and the third coordinate.

At 620, UE 115-e may communicate with satellite 120-e based on the position of satellite 120-e relative to the terrestrial-based reference. In some cases, uplink communication or downlink communication, or both, may be communicated between UE 115-e and satellite 120-e. In some cases, uplink communication or downlink communication, or both, may be communicated between UE 115-e, satellite 120-e, and a base station (e.g., a base station 105 of FIGS. 1 and 2). In some cases, UE 115-e may transmit, in a connected mode for a connection between UE 115-e and satellite 120-e, one or more uplink messages to satellite 120-e. In some cases, UE 115-e in the connected mode may transmit one or more uplink messages to the base station 105 via satellite 120-e. In some cases, satellite 120-e may transmit, while UE 115-e is in the connected mode, one or more downlink messages to UE 115-e. In some cases, the base station 105 may transmit the one or more downlink messages to UE 115-e via satellite 120-e while UE 115-e is in the connected mode.

In some examples, UE 115-e may communicate with the satellite 120-e based on the determined position of satellite 120-e, relative to the terrestrial-based reference. In some cases, the position of satellite 120-e is based on an altitude of satellite 120-e, the first value, the second value, and the third value. In some cases, UE 115-e may apply Doppler frequency compensation to the uplink communication or downlink communication based on the determined position of satellite 120-e. In some cases, the uplink communication and downlink communication may be communicated (e.g., transmitted or received) according to a timing synchronization or frequency synchronization, or both, based on the determined position of satellite 120-e.

Figure 7:
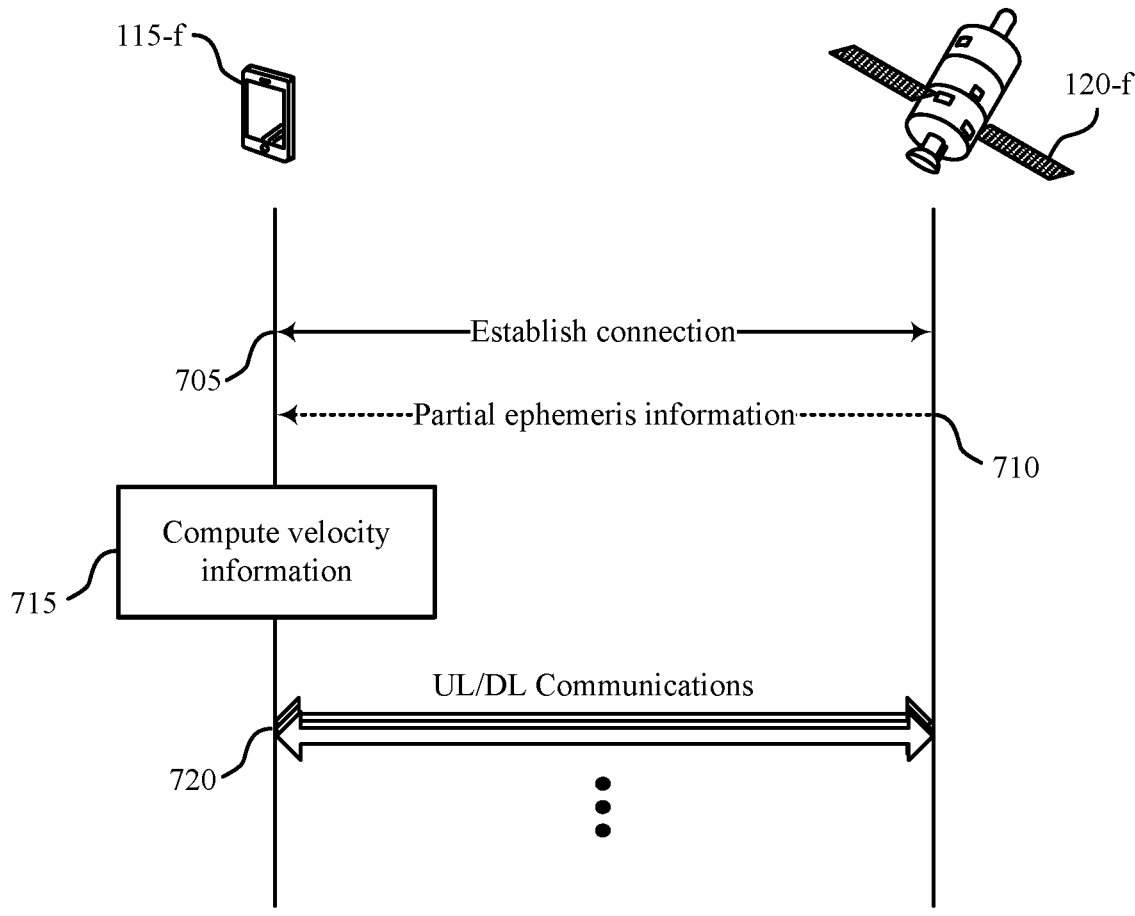
FIG. 7 illustrates an example of a process flow that supports location information in non-terrestrial networks in accordance with examples as disclosed herein.

FIG. 7 illustrates an example of a process flow 700 that supports location information in non-terrestrial networks in accordance with examples as disclosed herein.

At 705, UE 115-f may establish a connection with a network node of a non-terrestrial network (e.g., satellite 120-f). In some cases, UE 115-f may communicate control information or data, or both, to satellite 120-f based on the established connection. In some cases, UE 115-f may receive control information or data, or both, from satellite 120-f based on the established connection. In some cases, establishing the connection may include satellite 120-f sending ephemeris information (e.g., partial ephemeris information) to UE 115-f to enable UE 115-f to determine the velocity of satellite 120-f.

At 710, satellite 120-f may transmit partial ephemeris information to UE 115-f. The partial ephemeris information may include a first value or the first value and a second value that are associated with a velocity of satellite 120-f relative to a terrestrial-based reference (e.g., the center of the Earth). In some cases, the first value (e.g., received in the partial ephemeris information) may include a first velocity vector of satellite 120-f relative to the terrestrial-based reference, the second value may include a second velocity vector of satellite 120-f relative to the terrestrial-based reference, and the third value may include a third velocity vector of satellite 120-f relative to the terrestrial-based reference.

In some examples, UE 115-f may receive the first value or the first value and the second value based on a type of orbit around Earth of satellite 120-f. In some cases, UE 115-f may receive the first value (e.g., only the first value) when the type of orbit around Earth of satellite 120-f is a geostationary earth orbit. In some cases, UE 115-f may receive the first value and the second value when the type of orbit around Earth of satellite 120-f is a non-geostationary earth orbit (i.e., low earth orbit or medium earth orbit).

In some examples, the partial ephemeris information may include an indication of the altitude of satellite 120-f. In some cases, the indication may include a value of the altitude, an altitude differential value, or the type of orbit of satellite 120-f. In some cases, UE 115-f may derive the altitude when the indication includes the altitude differential value or the type of orbit of satellite 120-f. In some cases, the partial ephemeris information may include a correction value of the third value or a sign of the third value, or both. In some cases, the partial ephemeris information may include a correction value of the altitude of satellite 120-f or a sign of the third value, or both.

In some examples, the partial ephemeris information may include a radial vector of satellite 120-f, a tangent vector of satellite 120-f, and a velocity vector of satellite 120-f and determine the first velocity vector of satellite 120-f, the second velocity vector of satellite 120-f, and the third velocity vector of satellite 120-f, based on the radial vector of satellite 120-f, the tangent vector of satellite 120-f, the velocity vector of satellite 120-f.

In some examples, the first value of the partial ephemeris information may include a first difference between a current first velocity (e.g., current Vx) of satellite 120-f and a first target velocity (e.g., target Vx based on a target velocity of satellite 120-e) of satellite 120-f, and the second value may include a second difference between a current second velocity (e.g., current Vy) of satellite 120-f and a second target velocity (e.g., target Vy) of satellite 120-f. In some cases, the third value (e.g., Vz) may include a fixed value (e.g., Vz=0) based on the type of orbit of satellite 120-f.

In some examples, UE 115-g may receive an indication of a velocity of a reference network node (e.g., a second network node, a second satellite different from satellite 120-f). In some cases, the first value of the partial ephemeris information may include a first difference between the velocity of satellite 120-f and a second velocity of the reference network node, and the second value may include a second difference between the velocity of satellite 120-f and the second velocity of the reference network node. In some cases, the third value may include a fixed value based on the type of orbit of satellite 120-f. In some examples, the partial ephemeris information may include information about the second velocity of the reference network node and an indication of the reference network node associated with the first value and the second value. In some cases, communicating with satellite 120-f may be based on the velocity of satellite 120-f or the reference network node, or both.

In some examples, the indication of the velocity of the reference network node may include a velocity of the reference network node, or a reference time of the reference network node, or any combination thereof. In some cases, the indication of the velocity of the reference network node may include a differential velocity of the reference network node relative to satellite 120-g, or a differential reference time of the reference network node relative to satellite 120-g, or any combination thereof.

At 715, UE 115-f may compute the velocity of satellite 120-f based on the partial ephemeris information that UE 115-f receives from satellite 120-f. In some cases, UE 115-f computing the velocity of satellite 120-f may include UE 115-f computing one or more component velocities (e.g., computing one or more of Vx, Vy, and Vz) of satellite 120-f, or computing a result velocity of satellite 120-f (e.g., a resultant velocity based on component velocities Vx, Vy, and Vz of satellite 120-f), or any combination thereof. In some cases, the first value may be associated with a first component velocity (e.g., Vx), the second value may be associated with a second component velocity (e.g., Vy), and the third value may be associated with a third component velocity (e.g., Vz) of satellite 120-f in relation to a Cartesian three-coordinate velocity system. In some cases, the first value, the second value, and the third value of the velocity of satellite 120-f may include component velocities of satellite 120-f in an earth-centered, earth-fixed Cartesian coordinate system. In some cases, UE 115-f computing the velocity of satellite 120-f may include UE 115-f determining the third value based on the partial ephemeris information.

In some examples, UE 115-f computing the velocity of satellite 120-f may include UE 115-f applying the correction value of the altitude to the altitude of satellite 120-f and determining the velocity of satellite 120-f based on applying the correction value of the altitude to the altitude of satellite 120-f. In some cases, UE 115-f computing the velocity of satellite 120-f may include UE 115-f determining a corrected altitude based on the altitude and the correction value of the altitude and determine the velocity of satellite 120-f relative to the terrestrial-based reference based on the first value, the second value, the third value, and the corrected altitude of satellite 120-f.

In some examples, UE 115-f computing the velocity of satellite 120-f may include UE 115-f determining an absolute value of the third value (e.g., third velocity vector) based on the first velocity vector, the second velocity vector, a gravitational constant, a mass of the Earth, and the altitude of satellite 120-*f*. In some cases, UE 115-*f* computing the velocity of satellite 120-*f* may include UE 115-*f* determining a corrected third value (e.g., third velocity vector) based on the sign of the third value, the correction value of the third value, and the absolute value of the third value. In some cases, communicating with satellite 120-*f* is based on the first value (e.g., first velocity vector), the second value (e.g., second velocity vector), and the corrected third value (e.g., corrected third velocity vector).

In some examples, UE 115-*f* computing the velocity of satellite 120-*f* may include UE 115-*f* determining an absolute value of the third value based on the first value, the second value, the altitude of satellite 120-*f*, a first satellite velocity value based on a gravitational constant, a mass of the Earth, and a second satellite velocity value based on an angular speed of the Earth relative to the terrestrial-based reference. In some cases, UE 115-*f* may determine a relative velocity of satellite 120-*f* based on the first velocity vector of satellite 120-*f*, the second velocity vector of satellite 120-*f*, and the third velocity vector of satellite 120-*f*, and a velocity of UE 115-*f*. In some cases, communicating with satellite 120-*f* is based on the relative velocity of satellite 120-*f*.

In some examples, UE 115-*f* may receive a sign of the second value in the partial ephemeris information, determine the second value of satellite 120-*f* based on the first value received from satellite 120-*f*, a fixed value for the third value, and the altitude of satellite 120-*f*, and apply the sign to the determined second value. In some cases, UE 115-*f* may determine a first velocity of satellite 120-*f* based on the first value, a second velocity of satellite 120-*f* based on the second value, and a third velocity of satellite 120-*f* based on the fixed value. In some cases, UE 115-*f* may determine the resultant vector of satellite 120-*f* (e.g., summation of vectors in the x, y, and z directions) relative to the terrestrial-based reference based on the first component velocity (e.g., Vx), the second component velocity (e.g., Vy), and the third component velocity (e.g., Vz). In some cases, communicating with satellite 120-*f* is based on the component velocities of satellite 120-*f*, or the resultant velocity of satellite 120-*f*, or a combination thereof.

At 720, UE 115-*f* may communicate with satellite 120-*f* based on the position of satellite 120-*f* relative to the terrestrial-based reference. In some cases, uplink communication or downlink communication, or both, may be communicated between UE 115-*f* and satellite 120-*f*. In some cases, UE 115-*f* may communicate with the satellite 120-*f* based on the determined velocity of satellite 120-*f*, or both, relative to the terrestrial-based reference. In some cases, the velocity or the velocity of satellite 120-*f* is based on an altitude of satellite 120-*f*, the first value, the second value, and a third value. In some cases, UE 115-*f* may apply Doppler frequency compensation to the uplink communication or downlink communication based on the determined velocity of satellite 120-*f*. In some cases, the uplink communication and downlink communication may be communicated (e.g., transmitted or received) according to a timing synchronization or frequency synchronization, or both, based on the determined velocity of satellite 120-*f*.

Figure 8:
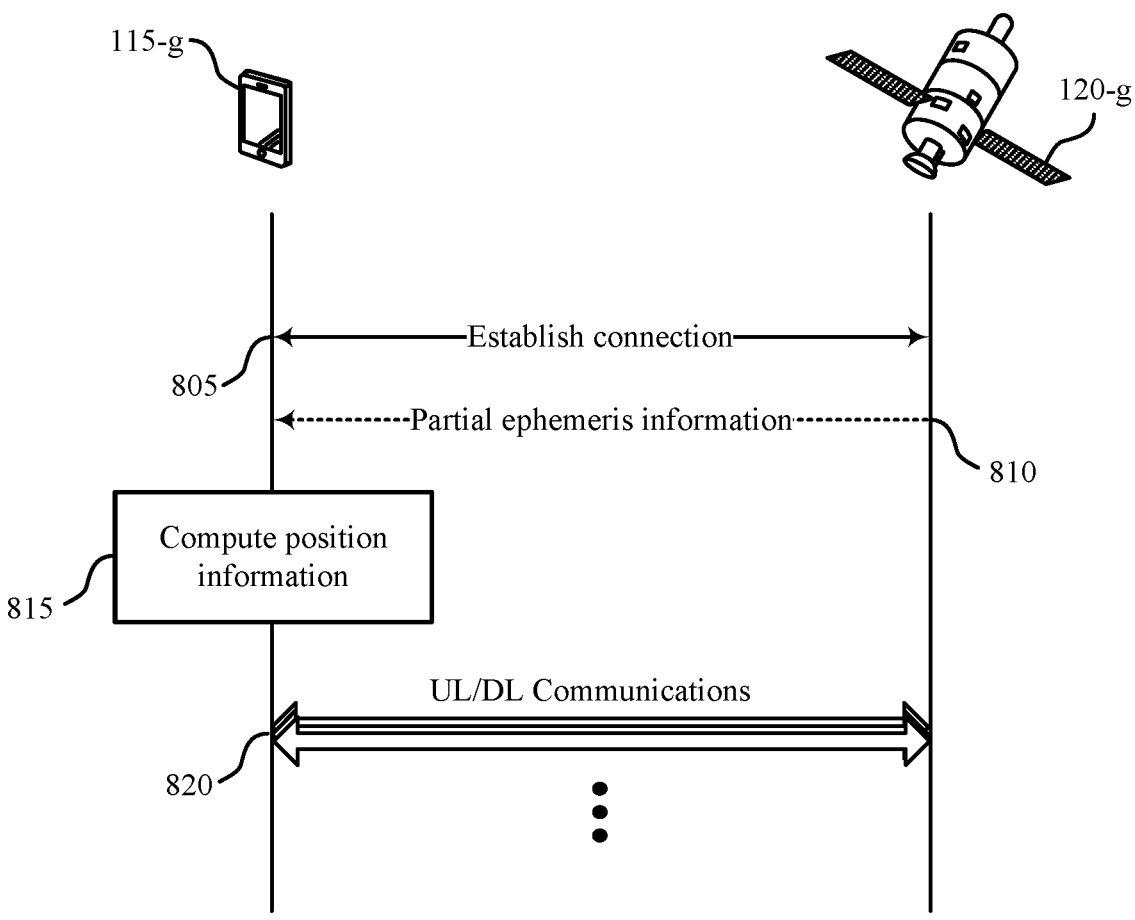
FIG. 8 illustrates an example of a process flow that supports location information in non-terrestrial networks in accordance with examples as disclosed herein.

FIG. 8 illustrates an example of a process flow 800 that supports location information in non-terrestrial networks in accordance with examples as disclosed herein.

At 805, UE 115-*g* may establish a connection with a network node of a non-terrestrial network (e.g., satellite 120-*g*). In some cases, UE 115-*g* may communicate control information or data, or both, to satellite 120-*g* based on the established connection. In some cases, UE 115-*g* may receive control information or data, or both, from satellite 120-*g* based on the established connection. In some cases, establishing the connection may include satellite 120-*g* sending ephemeris information (e.g., partial ephemeris information) to UE 115-*g* to enable UE 115-*g* to determine the position of satellite 120-*g*.

At 810, satellite 120-*g* may transmit partial ephemeris information to UE 115-*g*. The partial ephemeris information may include a first value or the first value and a second value that are associated with a position of satellite 120-*g* relative to a terrestrial-based reference (e.g., the center of the Earth). In some examples, UE 115-*g* may receive a first value or the first value and a second value based on a type of orbit around Earth of satellite 120-*g*. In some cases, the first value, and the second value may be associated with a position of satellite 120-*g* relative to a terrestrial-based reference. In some cases, the first value and the second value are associated with a polar coordinate system. In some cases, the first value (e.g., received in the partial ephemeris information) may include a first angle of satellite 120-*g* relative to the terrestrial-based reference (e.g., an azimuth angle or longitude angle of satellite 120-*g* relative to the center of the Earth), the second value (e.g., received in the partial ephemeris information or determined by UE 115-*g*) may include a second angle of satellite 120-*g* relative to the terrestrial-based reference (e.g., a zenith angle or latitude angle of satellite 120-*g* relative to the center of the Earth). In some cases, the position of satellite 120-*g* may be based on an altitude of satellite 120-*g*, the first value, and the second value.

In some examples, the partial ephemeris information may include an indication of the altitude of satellite 120-*g*. In some cases, the indication may include a value of the altitude, an altitude differential value, or the type of orbit of satellite 120-*g*. In some cases, UE 115-*g* may derive the altitude when the indication includes the altitude differential value or the type of orbit of satellite 120-*g*.

In some examples, the first value may include a first difference between a current first angle of satellite 120-*g* (e.g., current azimuth angle or current longitude angle of satellite 120-*g*) and a first target angle of satellite 120-*g* (e.g., target azimuth angle or target longitude angle of satellite 120-*g*), and the second value may include a second difference between a second current angle of satellite 120-*g* (a current zenith angle or current latitude angle of satellite 120-*g*) and a second target angle of satellite 120-*g* (e.g., a target zenith angle or target latitude angle of satellite 120-*g*).

In some examples, UE 115-*g* may determine a first angle of satellite 120-*g* based on the first value and a second angle of satellite 120-*g* based on the second value. In some cases, UE 115-*g* may determine the position of satellite 120-*g* relative to the terrestrial-based reference based on the first angle and the second angle. In some cases, may determine Cartesian coordinates (e.g., x, y, and z coordinates) of satellite 120-*g* based on the first angle and the second angle (e.g., based on polar coordinates of satellite 120-*g*). In some cases, communicating with satellite 120-*g* is based on the position of satellite 120-*g*.

In some examples, UE 115-*g* may identify the type of orbit of satellite 120-*g* and determine the position of satellite 120-*g* relative to the terrestrial-based reference based on the first value received from satellite 120-*g*, the second value being a fixed value based on the type of orbit of satellite 120-*g*, and the altitude of satellite 120-*g*.

In some examples, UE 115-*g* may receive a correction value of the altitude of satellite 120-*g* and apply the correction value of the altitude to the altitude of satellite 120-g. In some cases, UE 115-g may determine the position of satellite 120-g based on applying the correction value of the altitude to the altitude of satellite 120-g.

In some examples, UE 115-g may receive an indication of a position of a second network node (e.g., a reference network node, a second satellite different from satellite 120-g). In some cases, the indication of the position of the second network node may include a position of the second network node, or a reference time of the second network node, or any combination thereof. In some cases, the indication of the position of the second network node may include a differential position of the second network node relative to satellite 120-g, or a differential reference time of the second network node relative to satellite 120-g, or any combination thereof. In some cases, the indication of the position of the second network node may include a semi-major axis, or an eccentricity value, or an argument of periapsis, or a longitude of ascending node value, or an inclination value, or a mean anomaly value at an epoch time, or any combination thereof. In some cases, the indication of the position of the second network node may include a differential semi-major axis, or a differential eccentricity value, or a differential argument of periapsis, or a differential longitude of ascending node value, or a differential inclination value, or a differential mean anomaly value at an epoch time, or any combination thereof.

At 820, UE 115-g may communicate with satellite 120-g based on the position of satellite 120-g relative to the terrestrial-based reference. In some cases, uplink communication or downlink communication, or both, may be communicated between UE 115-g and satellite 120-g. In some cases, uplink communication or downlink communication, or both, may be communicated between UE 115-g, satellite 120-g, and a base station (e.g., a base station 105 of FIGS. 1 and 2). In some cases, UE 115-g may transmit, in a connected mode for a connection between UE 115-g and satellite 120-g, one or more uplink messages to satellite 120-g. In some cases, UE 115-g in the connected mode may transmit one or more uplink messages to the base station 105 via satellite 120-g. In some cases, satellite 120-g may transmit, while UE 115-g is in the connected mode, one or more downlink messages to UE 115-g. In some cases, the base station 105 may transmit the one or more downlink messages to UE 115-g via satellite 120-g while UE 115-g is in the connected mode.

Figure 9:
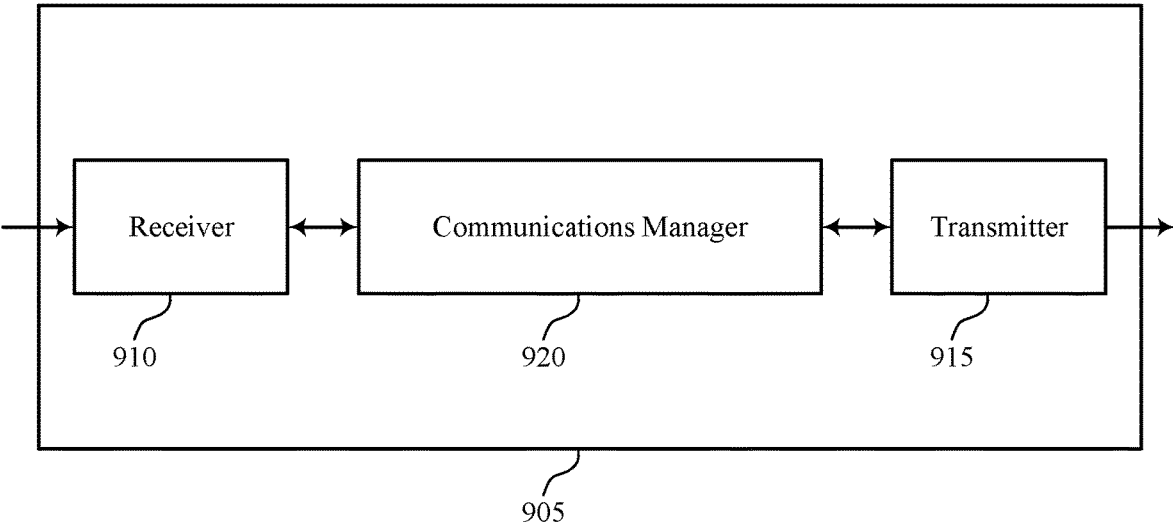
FIGS. 9 and 10 show block diagrams of devices that support location information in non-terrestrial networks in accordance with examples as disclosed herein.

FIG. 9 shows a block diagram 900 of a device 905 that supports location information in non-terrestrial networks in accordance with examples as disclosed herein. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to location information in non-terrestrial networks). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to location information in non-terrestrial networks). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of location information in non-terrestrial networks as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a UE in accordance with examples as disclosed herein. For example, the communications manager 920 may be configured as or otherwise support a means for establishing a connection between the UE and a network node of a non-terrestrial network. The communications manager 920 may be configured as or otherwise support a means for receiving, from the network node and based on a type of orbit around Earth of the network node, a first value or the first value and a second value associated with a position or a velocity of the network node relative to a terrestrial-based reference. The communications manager

920 may be configured as or otherwise support a means for communicating with the network node based on the position or the velocity of the network node, or both, relative to the terrestrial-based reference, where the position or the velocity of the network node is based on an altitude of the network node, the first value, the second value, and a third value.

Additionally or alternatively, the communications manager 920 may support wireless communication at a UE in accordance with examples as disclosed herein. For example, the communications manager 920 may be configured as or otherwise support a means for establishing a connection between the UE and a network node of a non-terrestrial network. The communications manager 920 may be configured as or otherwise support a means for receiving, from the network node and based on a type of orbit around Earth of the network node, a first value or the first value and a second value associated with a position of the network node relative to a terrestrial-based reference, where the first value and the second value are associated with a polar coordinate system. The communications manager 920 may be configured as or otherwise support a means for communicating with the network node based on the position of the network node relative to the terrestrial-based reference, where the position of the network node is based on an altitude of the network node, the first value, and the second value.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for decreasing data payload sizes of ephemeris information transmissions between a satellite 120 and device 905, decreasing bandwidth usage of ephemeris information transmissions between the satellite 120 and device 905, and decreasing latency associated with communicating ephemeris information between the satellite 120 and device 905, resulting in increased reliability of NTN-related transmissions, reduced processing, reduced power consumption, and more efficient utilization of communication resources.

Figure 10:
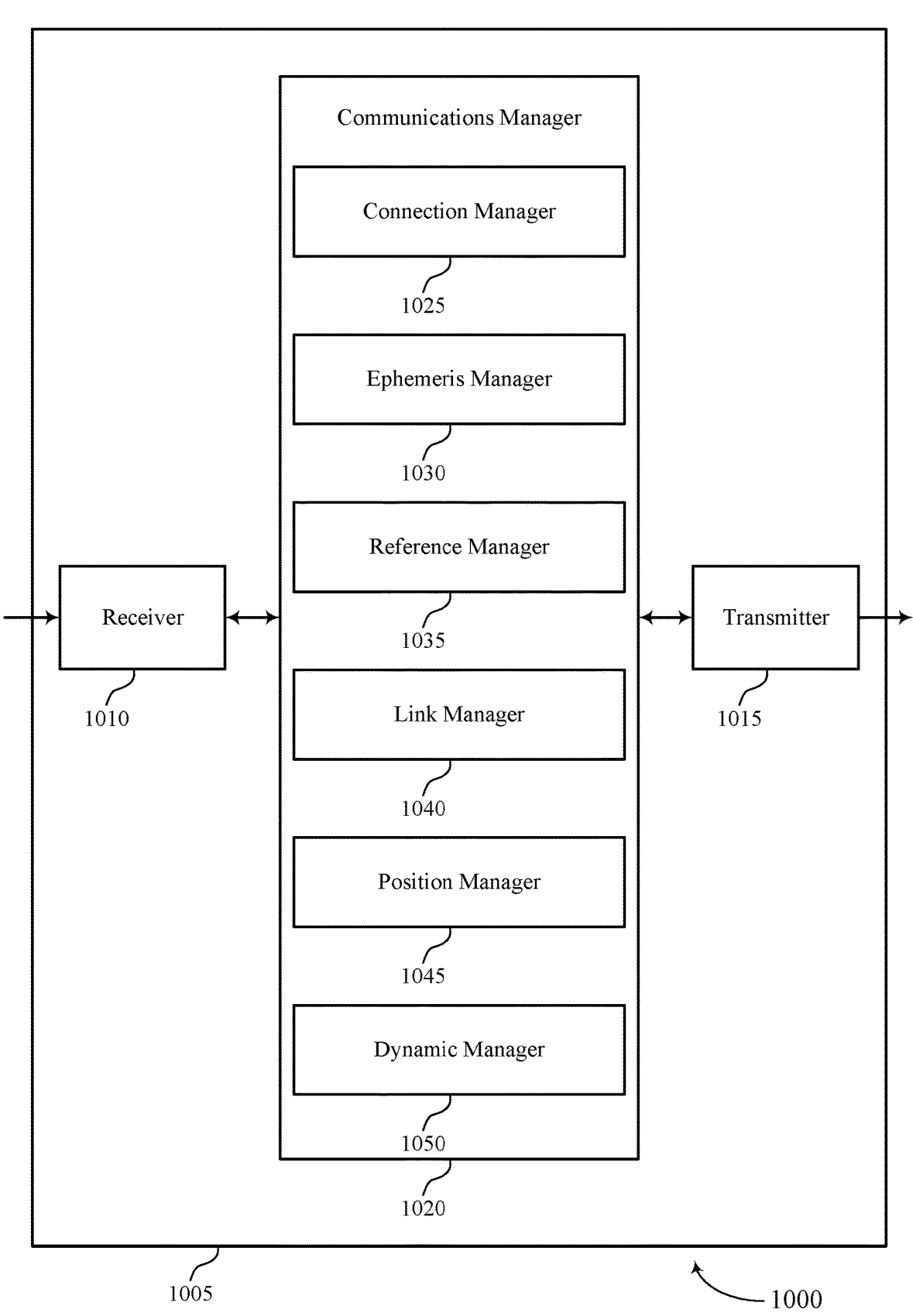

FIG. 10 shows a block diagram 1000 of a device 1005 that supports location information in non-terrestrial networks in accordance with examples as disclosed herein. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to location information in non-terrestrial networks). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to location information in non-terrestrial networks). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of location information in non-terrestrial networks as described herein. For example, the communications manager 1020 may include a connection manager 1025, an ephemeris manager 1030, a reference manager 1035, a link manager 1040, a position manager 1045, a dynamic manager 1050, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a UE in accordance with examples as disclosed herein. The connection manager 1025 may be configured as or otherwise support a means for establishing a connection between the UE and a network node of a non-terrestrial network. The ephemeris manager 1030 may be configured as or otherwise support a means for receiving, from the network node and based on a type of orbit around Earth of the network node, a first value or the first value and a second value associated with a position or a velocity of the network node relative to a terrestrial-based reference. The reference manager 1035 may be configured as or otherwise support a means for communicating with the network node based on the position or the velocity of the network node, or both, where the position or the velocity of the network node is based on an altitude of the network node, the first value, the second value, and a third value.

Additionally or alternatively, the communications manager 1020 may support wireless communication at a UE in accordance with examples as disclosed herein. The link manager 1040 may be configured as or otherwise support a means for establishing a connection between the UE and a network node of a non-terrestrial network. The position manager 1045 may be configured as or otherwise support a means for receiving, from the network node and based on a type of orbit around Earth of the network node, a first value or the first value and a second value associated with a position of the network node relative to a terrestrial-based reference, where the first value and the second value are associated with a polar coordinate system. The dynamic manager 1050 may be configured as or otherwise support a means for communicating with the network node based on the position of the network node relative to the terrestrial-based reference, where the position of the network node is based on an altitude of the network node, the first value, and the second value.

Figure 11:
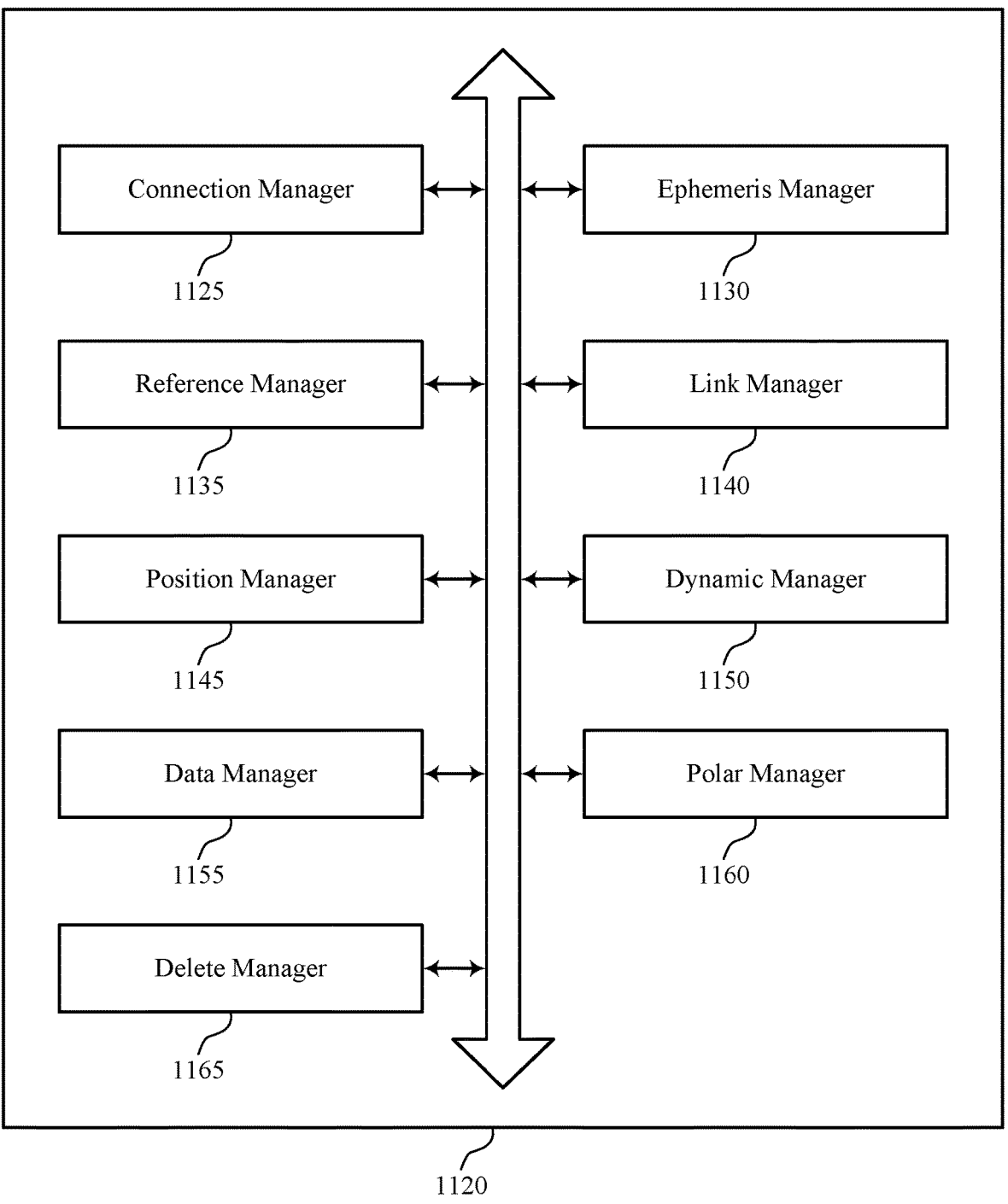
FIG. 11 shows a block diagram of a communications manager that supports location information in non-terrestrial networks in accordance with examples as disclosed herein.

FIG. 11 shows a block diagram 1100 of a communications manager 1120 that supports location information in non-terrestrial networks in accordance with examples as disclosed herein. The communications manager 1120 may be an example of aspects of a communications manager 920, a communications manager 1020, or both, as described herein. The communications manager 1120, or various components thereof, may be an example of means for performing various aspects of location information in non-terrestrial networks as described herein. For example, the communications manager 1120 may include a connection manager 1125, an ephemeris manager 1130, a reference manager 1135, a link manager 1140, a position manager 1145, a dynamic manager 1150, a data manager 1155, a polar manager 1160, a delete manager 1165, or any combination thereof. Each of these components may communicate, directly or indirectly, with one another (e.g., via one or more buses).

The communications manager 1120 may support wireless communication at a UE in accordance with examples as disclosed herein. The connection manager 1125 may be configured as or otherwise support a means for establishing a connection between the UE and a network node of a non-terrestrial network. The ephemeris manager 1130 may be configured as or otherwise support a means for receiving, from the network node and based on a type of orbit around Earth of the network node, a first value or the first value and a second value associated with a position or a velocity of the network node relative to a terrestrial-based reference. The reference manager 1135 may be configured as or otherwise support a means for communicating with the network node based on the position or the velocity of the network node, or both, where the position or the velocity of the network node is based on an altitude of the network node, the first value, the second value, and a third value.

In some examples, the ephemeris manager 1130 may be configured as or otherwise support a means for receiving, from the network node, an indication of the altitude of the network node, where the indication includes a value of the altitude, an altitude differential value, or the type of orbit of the network node, where the UE derives the altitude when the indication includes the altitude differential value or the type of orbit of the network node.

In some examples, the data manager 1155 may be configured as or otherwise support a means for determining an absolute value of the third value based on the first value, the second value, and the altitude of the network node.

In some examples, the data manager 1155 may be configured as or otherwise support a means for receiving, from the network node, a correction value of the third value and a sign of the third value. In some examples, the data manager 1155 may be configured as or otherwise support a means for determining a corrected third value based on applying the sign and the correction value of the third value to the absolute value of the third value. In some examples, the data manager 1155 may be configured as or otherwise support a means for determining the position of the network node relative to the terrestrial-based reference based on the first value, the second value, the corrected third value, and the altitude of the network node, where communicating with the network node is based on the position of the network node.

In some examples, the data manager 1155 may be configured as or otherwise support a means for receiving, from the network node, a correction value of the altitude of the network node and a sign of the third value. In some examples, the data manager 1155 may be configured as or otherwise support a means for applying the correction value of the altitude to the altitude of the network node. In some examples, the data manager 1155 may be configured as or otherwise support a means for determining the position of the network node based on applying the correction value of the altitude to the altitude of the network node.

In some examples, the data manager 1155 may be configured as or otherwise support a means for determining an absolute value of the third value based on the first value, the second value, and the correction value of the altitude applied to the altitude of the network node, where communicating with the network node is based on determining the absolute value of the third value, where the first value is of a first coordinate of the network node, the second value is of a second coordinate of the network node, and the third value is of a third coordinate of the network node of a three-coordinate positioning system. In some examples, the data manager 1155 may be configured as or otherwise support a means for determining a corrected third value based on applying the sign of the third value to the absolute value of the third value. In some examples, the data manager 1155 may be configured as or otherwise support a means for determining the position of the network node relative to the terrestrial-based reference based on the first value, the second value, the corrected third value, and the altitude of the network node.

In some examples, the data manager 1155 may be configured as or otherwise support a means for receiving, from the network node, a correction value of the altitude of the network node. In some examples, the data manager 1155 may be configured as or otherwise support a means for determining a corrected altitude based on the altitude and the correction value of the altitude. In some examples, the data manager 1155 may be configured as or otherwise support a means for determining the position of the network node relative to the terrestrial-based reference based on the first value, the second value, the third value, and the corrected altitude of the network node.

In some examples, the first value includes a first velocity vector of the network node relative to the terrestrial-based reference, the second value includes a second velocity vector of the network node relative to the terrestrial-based reference, and the third value includes a third velocity vector of the network node relative to the terrestrial-based reference.

In some examples, the data manager 1155 may be configured as or otherwise support a means for receiving, from the network node, a correction value of the third value and a sign of the third value. In some examples, the data manager 1155 may be configured as or otherwise support a means for determining an absolute value of the third velocity vector based on the first velocity vector, the second velocity vector, a gravitational constant, a mass of the Earth, and the altitude of the network node.

In some examples, the data manager 1155 may be configured as or otherwise support a means for determining a corrected third velocity vector based on the sign, the correction value of the third value, and the absolute value of the third velocity vector, where communicating with the network node is based on the first velocity vector, the second velocity vector, and the corrected third velocity vector.

In some examples, the data manager 1155 may be configured as or otherwise support a means for receiving, from the network node, a correction value of the third value and a sign of the third value. In some examples, the data manager 1155 may be configured as or otherwise support a means for determining an absolute value of the third velocity vector based on the first velocity vector, the second velocity vector, a first satellite velocity value based on a gravitational constant, a mass of the Earth, and the altitude of the network node, and a second satellite velocity value based on an angular speed of the Earth relative to the terrestrial-based reference.

In some examples, the data manager 1155 may be configured as or otherwise support a means for receiving, from the network node, a radial vector of the network node, a tangent vector of the network node, and a velocity vector of the network node. In some examples, the data manager 1155 may be configured as or otherwise support a means for determining the first velocity vector of the network node, the second velocity vector of the network node, and the third velocity vector of the network node, based on the radial vector of the network node, the tangent vector of the network node, the velocity vector of the network node. In some examples, the data manager 1155 may be configured as or otherwise support a means for determining a relative velocity of the network node based on the first velocity vector of the network node, the second velocity vector of the network node, and the third velocity vector of the network node, and a velocity of the UE, where communicating with the network node is based on the relative velocity of the network node.

In some examples, the ephemeris manager 1130 may be configured as or otherwise support a means for receiving an indication of the type of orbit of the network node, where communicating with the network node is based on receiving the indication of the type of orbit.

In some examples, the data manager 1155 may be configured as or otherwise support a means for identifying the type of orbit of the network node based on system information associated with the network node, where communicating with the network node is based on identifying the type of orbit.

In some examples, the data manager 1155 may be configured as or otherwise support a means for identifying a round-trip delay between the UE and the network node. In some examples, the data manager 1155 may be configured as or otherwise support a means for identifying the type of orbit of the network node based on the round-trip delay associated with the network node, where communicating with the network node is based on identifying the type of orbit.

In some examples, the first value includes a first difference between a current first coordinate of the network node and a target first coordinate of the network node, the second value includes a second difference between a current second coordinate of the network node and a target second coordinate of the network node and the third value includes a fixed value based on the type of orbit of the network node.

In some examples, the data manager 1155 may be configured as or otherwise support a means for determining a first coordinate of the network node based on the first value, a second coordinate of the network node based on the second value, and a third coordinate of the network node based on the fixed value. In some examples, the data manager 1155 may be configured as or otherwise support a means for determining the position of the network node relative to the terrestrial-based reference based on the first coordinate, the second coordinate, and the third coordinate, where communicating with the network node is based on the position of the network node.

In some examples, the first value includes a first difference between the position of the network node and a second position of a reference network node, the second value includes a second difference between the position of the network node and the second position of the reference network node and the third value includes a fixed value based on the type of orbit of the network node.

In some examples, the ephemeris manager 1130 may be configured as or otherwise support a means for receiving information about the second position of the reference network node and receiving an indication of the reference network node associated with the first value and the second value, where communicating with the network node is based on the receiving.

In some examples, the data manager 1155 may be configured as or otherwise support a means for receiving a sign of the second value. In some examples, the data manager 1155 may be configured as or otherwise support a means for determining the second value of the network node based on the first value received from the network node, a fixed value for the third value, and the altitude of the network node. In some examples, the data manager 1155 may be configured as or otherwise support a means for applying the sign to the determined second value.

In some examples, the altitude of the network node, a reference time, and the first value or the second value, or both, are received in one or more system information blocks or one or more radio resource control messages. In some examples, the position of the network node includes an ephemeris of the network node. In some examples, the first value, the second value, and the third value of the position of the network node includes geocentric coordinates of the network node in an earth-centered, earth-fixed Cartesian coordinate system.

Additionally or alternatively, the communications manager 1120 may support wireless communication at a UE in accordance with examples as disclosed herein. The link manager 1140 may be configured as or otherwise support a means for establishing a connection between the UE and a network node of a non-terrestrial network. The position manager 1145 may be configured as or otherwise support a means for receiving, from the network node and based on a type of orbit around Earth of the network node, a first value or the first value and a second value associated with a position of the network node relative to a terrestrial-based reference, where the first value and the second value are associated with a polar coordinate system. The dynamic manager 1150 may be configured as or otherwise support a means for communicating with the network node based on the position of the network node relative to the terrestrial-based reference, where the position of the network node is based on an altitude of the network node, the first value, and the second value.

In some examples, the position manager 1145 may be configured as or otherwise support a means for receiving, from the network node, an indication of the altitude of the network node, where the indication includes a value of the altitude, an altitude differential value, or the type of orbit of the network node, where the UE derives the altitude when the indication includes the altitude differential value or the type of orbit of the network node.

In some examples, the first value includes a first difference between a current first angle of the network node and a first target angle of the network node and the second value includes a second difference between a current second angle of the network node and a second target angle of the network node.

In some examples, the polar manager 1160 may be configured as or otherwise support a means for determining a first angle of the network node based on the first value and a second angle of the network node based on the second value. In some examples, the polar manager 1160 may be configured as or otherwise support a means for determining the position of the network node relative to the terrestrial-based reference based on the first angle and the second angle, where communicating with the network node is based on the position of the network node.

In some examples, the polar manager 1160 may be configured as or otherwise support a means for identifying the type of orbit of the network node. In some examples, the polar manager 1160 may be configured as or otherwise support a means for determining the position of the network node relative to the terrestrial-based reference based on the first value received from the network node, the second value being a fixed value based on the type of orbit of the network node, and the altitude of the network node, where communicating with the network node is based on the position of the network node.

In some examples, the terrestrial-based reference includes a center of the Earth. In some examples, the first value includes an azimuth angle or longitude angle of the network node relative to the center of the Earth. In some examples, the second value includes a zenith angle or latitude angle of the network node relative to the center of the Earth.

In some examples, the polar manager 1160 may be configured as or otherwise support a means for receiving, from the network node, a correction value of the altitude of the network node. In some examples, the polar manager 1160 may be configured as or otherwise support a means for applying the correction value of the altitude to the altitude of the network node. In some examples, the polar manager 1160 may be configured as or otherwise support a means for determining the position of the network node based on applying the correction value of the altitude to the altitude of the network node.

In some examples, the polar manager 1160 may be configured as or otherwise support a means for receiving, from the network node, an indication of a position of a second network node.

In some examples, the indication of the position of the second network node includes a position of the second network node, or a velocity of the second network node, or a reference time of the second network node, or any combination thereof.

In some examples, the indication of the position of the second network node includes a differential position of the second network node relative to the network node, or a differential velocity of the second network node relative to the network node, or a differential reference time of the second network node relative to the network node, or any combination thereof.

In some examples, the indication of the position of the second network node includes a semi-major axis, or an eccentricity value, or an argument of periapsis, or a longitude of ascending node value, or an inclination value, or a mean anomaly value at an epoch time, or any combination thereof.

In some examples, the indication of the position of the second network node includes a differential semi-major axis, or a differential eccentricity value, or a differential argument of periapsis, or a differential longitude of ascending node value, or a differential inclination value, or a differential mean anomaly value at an epoch time, or any combination thereof.

Figure 12:
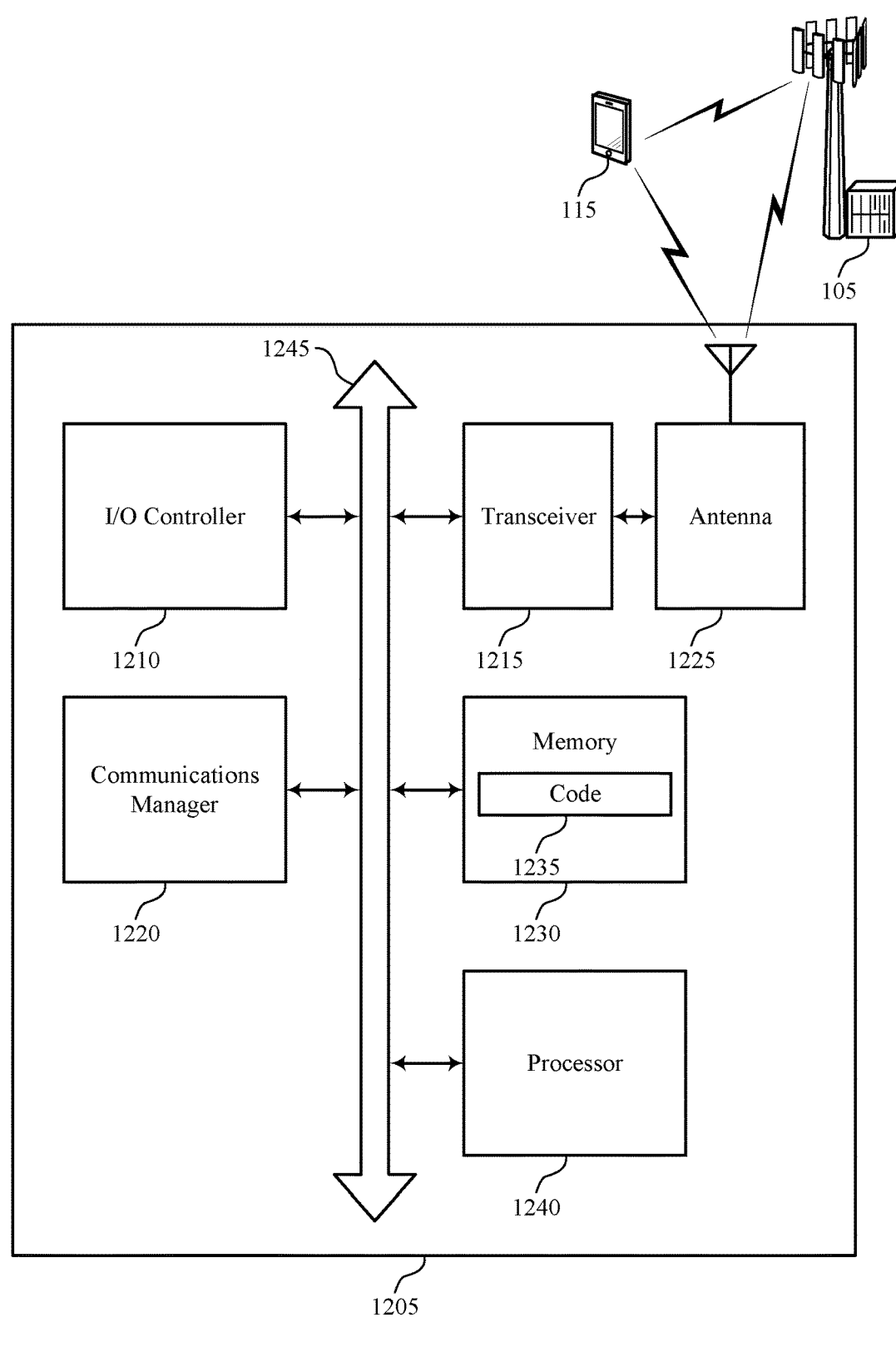
FIG. 12 shows a diagram of a system including a device that supports location information in non-terrestrial networks in accordance with examples as disclosed herein.

FIG. 12 shows a diagram of a system 1200 including a device 1205 that supports location information in non-terrestrial networks in accordance with examples as disclosed herein. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting location information in non-terrestrial networks). For example, the device 1205 or a component of the device 1205 may include a processor 1240 and memory 1230 coupled with the processor 1240, the processor 1240 and memory 1230 configured to perform various functions described herein.

The communications manager 1220 may support wireless communication at a UE in accordance with examples as disclosed herein. For example, the communications manager 1220 may be configured as or otherwise support a means for establishing a connection between the UE and a network node of a non-terrestrial network. The communications manager 1220 may be configured as or otherwise support a means for receiving, from the network node and based on a type of orbit around Earth of the network node, a first value or the first value and a second value associated with a position or a velocity of the network node relative to a terrestrial-based reference. The communications manager 1220 may be configured as or otherwise support a means for communicating with the network node based on the position or the velocity of the network node, or both, where the position or the velocity of the network node is based on an altitude of the network node, the first value, the second value, and a third value.

Additionally or alternatively, the communications manager 1220 may support wireless communication at a UE in accordance with examples as disclosed herein. For example, the communications manager 1220 may be configured as or otherwise support a means for establishing a connection between the UE and a network node of a non-terrestrial network. The communications manager 1220 may be configured as or otherwise support a means for receiving, from the network node and based on a type of orbit around Earth of the network node, a first value or the first value and a second value associated with a position of the network node relative to a terrestrial-based reference, where the first value and the second value are associated with a polar coordinate system. The communications manager 1220 may be configured as or otherwise support a means for communicating with the network node based on the position of the network node relative to the terrestrial-based reference, where the position of the network node is based on an altitude of the network node, the first value, and the second value.

By including or configuring the communications manager 1220 in accordance with examples as described herein, the device 1205 may support techniques for decreasing data payload sizes of ephemeris information transmissions between a satellite 120 and device 1205, decreasing bandwidth usage of ephemeris information transmissions between the satellite 120 and device 1205, and decreasing latency associated with communicating ephemeris information between the satellite 120 and device 1205, resulting in improved communication reliability, reduced latency, improved user experience related to reduced processing, reduced power consumption, more efficient utilization of communication resources, improved coordination between devices, longer battery life, and improved utilization of processing capability.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of location information in non-terrestrial networks as described herein, or the processor 1240 and the memory 1230 may be otherwise configured to perform or support such operations.

FIG. 13 shows a flowchart illustrating a method 1300 that supports location information in non-terrestrial networks in accordance with examples as disclosed herein. The operations of the method 1300 may be implemented by a UE or its components as described herein. For example, the operations of the method 1300 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1305, the method may include establishing a connection between the UE and a network node of a non-terrestrial network. The operations of 1305 may be performed in accordance with examples as disclosed herein. In some examples, aspects of the operations of 1305 may be performed by a connection manager 1125 as described with reference to FIG. 11.

At 1310, the method may include receiving, from the network node and based on a type of orbit around Earth of the network node, a first value or the first value and a second value associated with a position or a velocity of the network node relative to a terrestrial-based reference. The operations of 1310 may be performed in accordance with examples as disclosed herein. In some examples, aspects of the operations of 1310 may be performed by an ephemeris manager 1130 as described with reference to FIG. 11.

At 1315, the method may include communicating with the network node based on the position or the velocity of the network node, or both, where the position or the velocity of the network node is based on an altitude of the network node, the first value, the second value, and a third value. The operations of 1315 may be performed in accordance with examples as disclosed herein. In some examples, aspects of the operations of 1315 may be performed by a reference manager 1135 as described with reference to FIG. 11.

Figure 14:
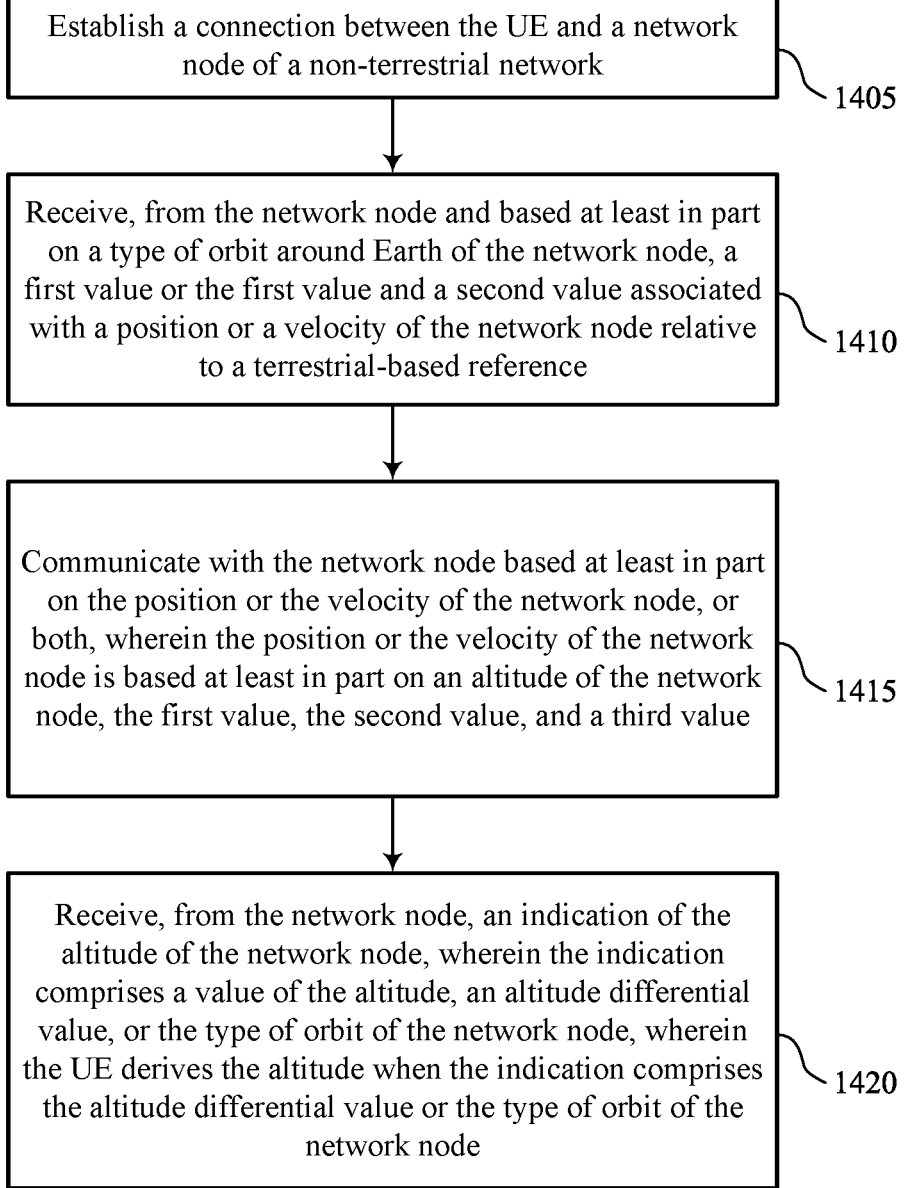

FIG. 14 shows a flowchart illustrating a method 1400 that supports location information in non-terrestrial networks in accordance with examples as disclosed herein. The operations of the method 1400 may be implemented by a UE or its components as described herein. For example, the operations of the method 1400 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1405, the method may include establishing a connection between the UE and a network node of a non-terrestrial network. The operations of 1405 may be performed in accordance with examples as disclosed herein. In some examples, aspects of the operations of 1405 may be performed by a connection manager 1125 as described with reference to FIG. 11.

At 1410, the method may include receiving, from the network node and based on a type of orbit around Earth of the network node, a first value or the first value and a second value associated with a position or a velocity of the network node relative to a terrestrial-based reference. The operations of 1410 may be performed in accordance with examples as disclosed herein. In some examples, aspects of the operations of 1410 may be performed by an ephemeris manager 1130 as described with reference to FIG. 11.

At 1415, the method may include communicating with the network node based on the position or the velocity of the network node, or both, where the position or the velocity of the network node is based on an altitude of the network node, the first value, the second value, and a third value. The operations of 1415 may be performed in accordance with examples as disclosed herein. In some examples, aspects of the operations of 1415 may be performed by a reference manager 1135 as described with reference to FIG. 11.

At 1420, the method may include receiving, from the network node, an indication of the altitude of the network node, where the indication includes a value of the altitude, an altitude differential value, or the type of orbit of the network node, where the UE derives the altitude when the indication includes the altitude differential value or the type of orbit of the network node. The operations of 1420 may be performed in accordance with examples as disclosed herein. In some examples, aspects of the operations of 1420 may be performed by an ephemeris manager 1130 as described with reference to FIG. 11.

FIG. 15 shows a flowchart illustrating a method 1500 that supports location information in non-terrestrial networks in accordance with examples as disclosed herein. The operations of the method 1500 may be implemented by a UE or its components as described herein. For example, the operations of the method 1500 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1505, the method may include establishing a connection between the UE and a network node of a non-terrestrial network. The operations of 1505 may be performed in accordance with examples as disclosed herein. In some examples, aspects of the operations of 1505 may be performed by a link manager 1140 as described with reference to FIG. 11.

At 1510, the method may include receiving, from the network node and based on a type of orbit around Earth of the network node, a first value or the first value and a second value associated with a position of the network node relative to a terrestrial-based reference, where the first value and the second value are associated with a polar coordinate system. The operations of 1510 may be performed in accordance with examples as disclosed herein. In some examples, aspects of the operations of 1510 may be performed by a position manager 1145 as described with reference to FIG. 11.

At 1515, the method may include communicating with the network node based on the position of the network node relative to the terrestrial-based reference, where the position of the network node is based on an altitude of the network node, the first value, and the second value. The operations of 1515 may be performed in accordance with examples as disclosed herein. In some examples, aspects of the operations of 1515 may be performed by a dynamic manager 1150 as described with reference to FIG. 11.

FIG. 16 shows a flowchart illustrating a method 1600 that supports location information in non-terrestrial networks in accordance with examples as disclosed herein. The operations of the method 1600 may be implemented by a UE or its components as described herein. For example, the operations of the method 1600 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1605, the method may include establishing a connection between the UE and a network node of a non-terrestrial network. The operations of 1605 may be performed in accordance with examples as disclosed herein. In some examples, aspects of the operations of 1605 may be performed by a link manager 1140 as described with reference to FIG. 11.

At 1610, the method may include receiving, from the network node and based on a type of orbit around Earth of the network node, a first value or the first value and a second value associated with a position of the network node relative to a terrestrial-based reference, where the first value and the second value are associated with a polar coordinate system. The operations of 1610 may be performed in accordance with examples as disclosed herein. In some examples, aspects of the operations of 1610 may be performed by a position manager 1145 as described with reference to FIG. 11.

At 1615, the method may include communicating with the network node based on the position of the network node relative to the terrestrial-based reference, where the position of the network node is based on an altitude of the network node, the first value, and the second value. The operations of 1615 may be performed in accordance with examples as disclosed herein. In some examples, aspects of the operations of 1615 may be performed by a dynamic manager 1150 as described with reference to FIG. 11.

At 1620, the method may include receiving, from the network node, an indication of the altitude of the network node, where the indication includes a value of the altitude, an altitude differential value, or the type of orbit of the network node, where the UE derives the altitude when the indication includes the altitude differential value or the type of orbit of the network node. The operations of 1620 may be performed in accordance with examples as disclosed herein. In some examples, aspects of the operations of 1620 may be performed by a position manager 1145 as described with reference to FIG. 11.

The following provides an overview of examples as disclosed herein:

Aspect 1: A method for wireless communication at a UE, comprising: establishing a connection between the UE and a network node of a non-terrestrial network; receiving, from the network node and based at least in part on a type of orbit around Earth of the network node, a first value or the first value and a second value associated with a position or a velocity of the network node relative to a terrestrial-based reference; and communicating with the network node based at least in part on the position or the velocity of the network node, or both, wherein the position or the velocity of the network node is based at least in part on an altitude of the network node, the first value, the second value, and a third value.

Aspect 2: The method of aspect 1, further comprising: receiving, from the network node, an indication of the altitude of the network node, wherein the indication comprises a value of the altitude, an altitude differential value, or the type of orbit of the network node, wherein the UE derives the altitude when the indication comprises the altitude differential value or the type of orbit of the network node.

Aspect 3: The method of any of aspects 1 through 2, comprising: determining an absolute value of the third value based at least in part on the first value, the second value, and the altitude of the network node.

Aspect 4: The method of aspect 3, comprising: receiving, from the network node, a correction value of the third value and a sign of the third value; determining a corrected third value based at least in part on applying the sign and the correction value of the third value to the absolute value of the third value; and determining the position of the network node relative to the terrestrial-based reference based at least in part on the first value, the second value, the corrected third value, and the altitude of the network node, wherein communicating with the network node is based at least in part on the position of the network node.

Aspect 5: The method of any of aspects 1 through 4, further comprising: receiving, from the network node, a correction value of the altitude of the network node and a sign of the third value; applying the correction value of the altitude to the altitude of the network node; and determining the position of the network node based at least in part on applying the correction value of the altitude to the altitude of the network node.

Aspect 6: The method of aspect 5, further comprising: determining an absolute value of the third value based at least in part on the first value, the second value, and the correction value of the altitude applied to the altitude of the network node, wherein communicating with the network node is based at least in part on determining the absolute value of the third value, wherein the first value is of a first coordinate of the network node, the second value is of a second coordinate of the network node, and the third value is of a third coordinate of the network node of a three-coordinate positioning system; determining a corrected third value based at least in part on applying the sign of the third value to the absolute value of the third value; and determining the position of the network node relative to the terrestrial-based reference based at least in part on the first value, the second value, the corrected third value, and the altitude of the network node.

Aspect 7: The method of any of aspects 1 through 6, further comprising: receiving, from the network node, a correction value of the altitude of the network node; determining a corrected altitude based at least in part on the altitude and the correction value of the altitude; and determining the position of the network node relative to the terrestrial-based reference based at least in part on the first value, the second value, the third value, and the corrected altitude of the network node.

Aspect 8: The method of any of aspects 1 through 7, wherein the first value comprises a first velocity vector of the network node relative to the terrestrial-based reference, the second value comprises a second velocity vector of the network node relative to the terrestrial-based reference, and the third value comprises a third velocity vector of the network node relative to the terrestrial-based reference.

Aspect 9: The method of aspect 8, further comprising: receiving, from the network node, a correction value of the third value and a sign of the third value; determining an absolute value of the third velocity vector based at least in part on the first velocity vector, the second velocity vector, a gravitational constant, a mass of the Earth, and the altitude of the network node.

Aspect 10: The method of aspect 9, comprising: determining a corrected third velocity vector based at least in part on the sign, the correction value of the third value, and the absolute value of the third velocity vector, wherein communicating with the network node is based at least in part on the first velocity vector, the second velocity vector, and the corrected third velocity vector.

Aspect 11: The method of any of aspects 8 through 10, further comprising: receiving, from the network node, a correction value of the third value and a sign of the third value; determining an absolute value of the third velocity vector based at least in part on the first velocity vector, the second velocity vector, a first satellite velocity value based at least in part on a gravitational constant, a mass of the Earth, and the altitude of the network node, and a second satellite velocity value based at least in part on an angular speed of the Earth relative to the terrestrial-based reference.

Aspect 12: The method of any of aspects 8 through 11, further comprising: receiving, from the network node, a radial vector of the network node, a tangent vector of the network node, and a velocity vector of the network node; determining the first velocity vector of the network node, the second velocity vector of the network node, and the third velocity vector of the network node, based at least in part on the radial vector of the network node, the tangent vector of the network node, the velocity vector of the network node; and determining a relative velocity of the network node based at least in part on the first velocity vector of the network node, the second velocity vector of the network node, and the third velocity vector of the network node, and a velocity of the UE, wherein communicating with the network node is based at least in part on the relative velocity of the network node.

Aspect 13: The method of any of aspects 1 through 12, further comprising: receiving an indication of the type of orbit of the network node, wherein communicating with the network node is based at least in part on receiving the indication of the type of orbit.

Aspect 14: The method of any of aspects 1 through 13, further comprising: identifying the type of orbit of the network node based at least in part on system information associated with the network node, wherein communicating with the network node is based at least in part on identifying the type of orbit.

Aspect 15: The method of any of aspects 1 through 14, further comprising: identifying a round-trip delay between the UE and the network node; and identifying the type of orbit of the network node based at least in part on the round-trip delay associated with the network node, wherein communicating with the network node is based at least in part on identifying the type of orbit.

Aspect 16: The method of any of aspects 1 through 15, wherein the first value comprises a first difference between a current first coordinate of the network node and a target first coordinate of the network node, the second value comprises a second difference between a current second coordinate of the network node and a target second coordinate of the network node and the third value comprises a fixed value based at least in part on the type of orbit of the network node.

Aspect 17: The method of aspect 16, further comprising: determining a first coordinate of the network node based at least in part on the first value, a second coordinate of the network node based at least in part on the second value, and a third coordinate of the network node based at least in part on the fixed value; and determining the position of the network node relative to the terrestrial-based reference based at least in part on the first coordinate, the second coordinate, and the third coordinate, wherein communicating with the network node is based at least in part on the position of the network node.

Aspect 18: The method of any of aspects 1 through 17, wherein the first value comprises a first difference between the position of the network node and a second position of a reference network node, the second value comprises a second difference between the position of the network node and the second position of the reference network node and the third value comprises a fixed value based at least in part on the type of orbit of the network node.

Aspect 19: The method of aspect 18, further comprising: receiving information about the second position of the reference network node and receiving an indication of the reference network node associated with the first value and the second value, wherein communicating with the network node is based at least in part on the receiving.

Aspect 20: The method of any of aspects 1 through 19, further comprising: receiving a sign of the second value; determining the second value of the network node based at least in part on the first value received from the network node, a fixed value for the third value, and the altitude of the network node, and applying the sign to the determined second value.

Aspect 21: The method of any of aspects 1 through 20, wherein the altitude of the network node, a reference time, and the first value or the second value, or both, are received in one or more system information blocks or one or more radio resource control messages.

Aspect 22: The method of any of aspects 1 through 21, wherein the position of the network node comprises an ephemeris of the network node.

Aspect 23: The method of any of aspects 1 through 22, wherein the first value, the second value, and the third value of the position of the network node comprises geocentric coordinates of the network node in an earth-centered, earth-fixed Cartesian coordinate system.

Aspect 24: A method for wireless communication at a UE, comprising: establishing a connection between the UE and a network node of a non-terrestrial network; receiving, from the network node and based at least in part on a type of orbit around Earth of the network node, a first value or the first value and a second value associated with a position of the network node relative to a terrestrial-based reference, wherein the first value and the second value are associated with a polar coordinate system; and communicating with the network node based at least in part on the position of the network node relative to the terrestrial-based reference, wherein the position of the network node is based at least in part on an altitude of the network node, the first value, and the second value.

Aspect 25: The method of aspect 24, further comprising: receiving, from the network node, an indication of the altitude of the network node, wherein the indication comprises a value of the altitude, an altitude differential value, or the type of orbit of the network node, wherein the UE derives the altitude when the indication comprises the altitude differential value or the type of orbit of the network node.

Aspect 26: The method of any of aspects 24 through 25, wherein the first value comprises a first difference between a current first angle of the network node and a first target angle of the network node and the second value comprises a second difference between a current second angle of the network node and a second target angle of the network node.

Aspect 27: The method of aspect 26, further comprising: determining a first angle of the network node based at least in part on the first value and a second angle of the network node based at least in part on the second value; and determining the position of the network node relative to the terrestrial-based reference based at least in part on the first angle and the second angle, wherein communicating with the network node is based at least in part on the position of the network node.

Aspect 28: The method of any of aspects 24 through 27, further comprising: identifying the type of orbit of the network node; and determining the position of the network node relative to the terrestrial-based reference based at least in part on the first value received from the network node, the second value being a fixed value based at least in part on the type of orbit of the network node, and the altitude of the network node, wherein communicating with the network node is based at least in part on the position of the network node.

Aspect 29: The method of any of aspects 24 through 28, wherein the terrestrial-based reference comprises a center of the Earth; the first value comprises an azimuth angle or longitude angle of the network node relative to the center of the Earth; and the second value comprises a zenith angle or latitude angle of the network node relative to the center of the Earth.

Aspect 30: The method of any of aspects 24 through 29, further comprising: receiving, from the network node, a correction value of the altitude of the network node; applying the correction value of the altitude to the altitude of the network node; and determining the position of the network node based at least in part on applying the correction value of the altitude to the altitude of the network node.

Aspect 31: The method of any of aspects 24 through 30, further comprising: receiving, from the network node, an indication of a position of a second network node.

Aspect 32: The method of aspect 31, wherein the indication of the position of the second network node comprises a position of the second network node, or a velocity of the second network node, or a reference time of the second network node, or any combination thereof.

Aspect 33: The method of any of aspects 31 through 32, wherein the indication of the position of the second network node comprises a differential position of the second network node relative to the network node, or a differential velocity of the second network node relative to the network node, or a differential reference time of the second network node relative to the network node, or any combination thereof.

Aspect 34: The method of any of aspects 31 through 33, wherein the indication of the position of the second network node comprises a semi-major axis, or an eccentricity value, or an argument of periapsis, or a longitude of ascending node value, or an inclination value, or a mean anomaly value at an epoch time, or any combination thereof.

Aspect 35: The method of any of aspects 31 through 34, wherein the indication of the position of the second network node comprises a differential semi-major axis, or a differential eccentricity value, or a differential argument of periapsis, or a differential longitude of ascending node value, or a differential inclination value, or a differential mean anomaly value at an epoch time, or any combination thereof.

Aspect 36: An apparatus for wireless communication at a UE, comprising a processor; memory coupled with the processor; and instructions stored in the memory and executable by the processor to cause the apparatus to perform a method of any of aspects 1 through 23.

Aspect 37: An apparatus for wireless communication at a UE, comprising at least one means for performing a method of any of aspects 1 through 23.

Aspect 38: A non-transitory computer-readable medium storing code for wireless communication at a UE, the code comprising instructions executable by a processor to perform a method of any of aspects 1 through 23.

Aspect 39: An apparatus for wireless communication at a UE, comprising a processor; memory coupled with the processor; and instructions stored in the memory and executable by the processor to cause the apparatus to perform a method of any of aspects 24 through 35.

Aspect 40: An apparatus for wireless communication at a UE, comprising at least one means for performing a method of any of aspects 24 through 35.

Aspect 41: A non-transitory computer-readable medium storing code for wireless communication at a UE, the code comprising instructions executable by a processor to perform a method of any of aspects 24 through 35.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

establishing a connection between the UE and a network node of a non-terrestrial network;

receiving, from the network node and based at least in part on a type of orbit around Earth of the network node, differential ephemeris information comprising a first value or the first value and a second value associated with a position or a velocity of the network node relative to a terrestrial-based reference; and communicating with the network node based at least in part on the position or the velocity of the network node, or both, wherein the position or the velocity of the network node is based at least in part on ephemeris information comprising an altitude of the network node, the first value, the second value, and a third value, wherein the third value is computed at the UE based at least in part on the differential ephemeris information received at the UE.

2. The method of claim 1, further comprising:

receiving, from the network node, an indication of the altitude of the network node, wherein the indication comprises a value of the altitude, an altitude differential value, or the type of orbit of the network node, wherein the UE derives the altitude when the indication comprises the altitude differential value or the type of orbit of the network node.

3. The method of claim 1, further comprising:

determining an absolute value of the third value based at least in part on the first value, the second value, and the altitude of the network node, wherein the first value, the second value, and the third value of the position of the network node comprises geocentric coordinates of the network node in an earth-centered, earth-fixed Cartesian coordinate system.

4. The method of claim 3, further comprising:

receiving, from the network node, a correction value of the third value and a sign of the third value;

determining a corrected third value based at least in part on applying the sign and the correction value of the third value to the absolute value of the third value; and determining the position of the network node relative to the terrestrial-based reference based at least in part on the first value, the second value, the corrected third value, and the altitude of the network node, wherein communicating with the network node is based at least in part on the position of the network node.

5. The method of claim 1, further comprising:

receiving, from the network node, a correction value of the altitude of the network node and a sign of the third value;

applying the correction value of the altitude to the altitude of the network node; and determining the position of the network node based at least in part on applying the correction value of the altitude to the altitude of the network node.

6. The method of claim 5, further comprising:

determining an absolute value of the third value based at least in part on the first value, the second value, and the correction value of the altitude applied to the altitude of the network node, wherein communicating with the network node is based at least in part on determining the absolute value of the third value, wherein the first value is of a first coordinate of the network node, the second value is of a second coordinate of the network node, and the third value is of a third coordinate of the network node of a three-coordinate positioning system;

determining a corrected third value based at least in part on applying the sign of the third value to the absolute value of the third value; and determining the position of the network node relative to the terrestrial-based reference based at least in part on the first value, the second value, the corrected third value, and the altitude of the network node.

7. The method of claim 1, further comprising:

receiving, from the network node, a correction value of the altitude of the network node, wherein the altitude of the network node, a reference time, and the first value or the second value, or both, are received in one or more system information blocks or one or more radio resource control messages;

determining a corrected altitude based at least in part on the altitude and the correction value of the altitude; and determining the position of the network node relative to the terrestrial-based reference based at least in part on the first value, the second value, the third value, and the corrected altitude of the network node.

8. The method of claim 1, wherein the first value comprises a first velocity vector of the network node relative to the terrestrial-based reference, the second value comprises a second velocity vector of the network node relative to the terrestrial-based reference, and the third value comprises a third velocity vector of the network node relative to the terrestrial-based reference.

9. The method of claim 8, further comprising:

receiving, from the network node, a correction value of the third value and a sign of the third value;

determining an absolute value of the third velocity vector based at least in part on the first velocity vector, the second velocity vector, a gravitational constant, a mass of the Earth, and the altitude of the network node; and determining a corrected third velocity vector based at least in part on the sign, the correction value of the third value, and the absolute value of the third velocity vector, wherein communicating with the network node is based at least in part on the first velocity vector, the second velocity vector, and the corrected third velocity vector.

10. The method of claim 8, further comprising:

receiving, from the network node, a correction value of the third value and a sign of the third value; and determining an absolute value of the third velocity vector based at least in part on the first velocity vector, the second velocity vector, a first satellite velocity value based at least in part on a gravitational constant, a mass of the Earth, and the altitude of the network node, and a second satellite velocity value based at least in part on an angular speed of the Earth relative to the terrestrial-based reference.

11. The method of claim 8, further comprising:
receiving, from the network node, a radial vector of the network node, a tangent vector of the network node, and a velocity vector of the network node;
determining the first velocity vector of the network node, the second velocity vector of the network node, and the third velocity vector of the network node, based at least in part on the radial vector of the network node, the tangent vector of the network node, the velocity vector of the network node; and
determining a relative velocity of the network node based at least in part on the first velocity vector of the network node, the second velocity vector of the network node, and the third velocity vector of the network node, and a velocity of the UE, wherein communicating with the network node is based at least in part on the relative velocity of the network node.

12. The method of claim 1, further comprising:
receiving an indication of the type of orbit of the network node, wherein communicating with the network node is based at least in part on receiving the indication of the type of orbit.

13. The method of claim 1, further comprising:
identifying the type of orbit of the network node based at least in part on system information associated with the network node, wherein communicating with the network node is based at least in part on identifying the type of orbit.

14. The method of claim 1, further comprising:
identifying a round-trip delay between the UE and the network node; and
identifying the type of orbit of the network node based at least in part on the round-trip delay associated with the network node, wherein communicating with the network node is based at least in part on identifying the type of orbit.

15. The method of claim 1, wherein the first value comprises a first difference between a current first coordinate of the network node and a target first coordinate of the network node, the second value comprises a second difference between a current second coordinate of the network node and a target second coordinate of the network node and the third value comprises a fixed value based at least in part on the type of orbit of the network node.

16. The method of claim 15, further comprising:
determining a first coordinate of the network node based at least in part on the first value, a second coordinate of the network node based at least in part on the second value, and a third coordinate of the network node based at least in part on the fixed value; and
determining the position of the network node relative to the terrestrial-based reference based at least in part on the first coordinate, the second coordinate, and the third coordinate, wherein communicating with the network node is based at least in part on the position of the network node.

17. The method of claim 1, further comprising:
receiving information about a second position of a reference network node and receiving an indication of the reference network node associated with the first value and the second value, wherein communicating with the network node is based at least in part on the receiving of information about the second position or receiving the indication of the reference network node, or both, wherein the first value comprises a first difference between the position of the network node and the second position of the reference network node, the second value comprises a second difference between the position of the network node and the second position of the reference network node, and the third value comprises a fixed value based at least in part on the type of orbit of the network node.

18. The method of claim 1, further comprising:
receiving a sign of the second value;
determining the second value of the network node based at least in part on the first value received from the network node, a fixed value for the third value, and the altitude of the network node, and
applying the sign to the determined second value.

19. A method for wireless communication at a user equipment (UE), comprising:
establishing a connection between the UE and a network node of a non-terrestrial network;
receiving, from the network node and based at least in part on a type of orbit around Earth of the network node, a first value or the first value and a second value associated with a position of the network node relative to a terrestrial-based reference, wherein the first value and the second value are associated with a polar coordinate system, and wherein the first value corresponds to an azimuth angle and the second value corresponds to a zenith angle; and
communicating with the network node based at least in part on the position of the network node relative to the terrestrial-based reference, wherein the position of the network node is based at least in part on an altitude of the network node, the first value, and the second value.

20. The method of claim 19, further comprising:
receiving, from the network node, an indication of the altitude of the network node, wherein the indication comprises a value of the altitude, an altitude differential value, or the type of orbit of the network node, wherein the UE derives the altitude when the indication comprises the altitude differential value or the type of orbit of the network node.

21. The method of claim 19, further comprising:
determining a first angle of the network node based at least in part on the first value and a second angle of the network node based at least in part on the second value; and
determining the position of the network node relative to the terrestrial-based reference based at least in part on the first angle and the second angle, wherein communicating with the network node is based at least in part on the position of the network node, wherein the first value comprises a first difference between a current first angle of the network node and a first target angle of the network node and the second value comprises a second difference between a current second angle of the network node and a second target angle of the network node.

22. The method of claim 19, further comprising:
identifying the type of orbit of the network node; and
determining the position of the network node relative to the terrestrial-based reference based at least in part on the first value received from the network node, the second value being a fixed value based at least in part on the type of orbit of the network node, and the altitude of the network node, wherein communicating with the network node is based at least in part on the position of the network node.

23. The method of claim 19, wherein:

the terrestrial-based reference comprises a center of the Earth;

the first value comprises the azimuth angle or a longitude angle of the network node relative to the center of the Earth; and the second value comprises the zenith angle or a latitude angle of the network node relative to the center of the Earth.

24. The method of claim 19, further comprising:

receiving, from the network node, an indication of a position of a second network node.

25. The method of claim 24, wherein the indication of the position of the second network node comprises the position of the second network node, or a velocity of the second network node, or a reference time of the second network node, or any combination thereof.

26. The method of claim 24, wherein the indication of the position of the second network node comprises a differential position of the second network node relative to the network node, or a differential velocity of the second network node relative to the network node, or a differential reference time of the second network node relative to the network node, or any combination thereof.

27. The method of claim 24, wherein the indication of the position of the second network node comprises a semi-major axis, or an eccentricity value, or an argument of periapsis, or a longitude of ascending node value, or an inclination value, or a mean anomaly value at an epoch time, or any combination thereof.

28. The method of claim 24, wherein the indication of the position of the second network node comprises a differential semi-major axis, or a differential eccentricity value, or a differential argument of periapsis, or a differential longitude of ascending node value, or a differential inclination value, or a differential mean anomaly value at an epoch time, or any combination thereof.

29. An apparatus for wireless communication at a user equipment (UE), comprising:

a processor;

memory coupled with the processor; and instructions stored in the memory and executable by the processor to cause the apparatus to:

establish a connection between the UE and a network node of a non-terrestrial network;

receive, from the network node and based at least in part on a type of orbit around Earth of the network node, differential ephemeris information comprising a first value or the first value and a second value associated with a position or a velocity of the network node relative to a terrestrial-based reference; and communicate with the network node based at least in part on the position or the velocity of the network node, or both, wherein the position or the velocity of the network node is based at least in part on ephemeris information comprising an altitude of the network node, the first value, the second value, and a third value, wherein the third value is computed at the UE based at least in part on the differential ephemeris information received at the UE.

30. An apparatus for wireless communication at a user equipment (UE), comprising:

a processor;

memory coupled with the processor; and instructions stored in the memory and executable by the processor to cause the apparatus to:

establish a connection between the UE and a network node of a non-terrestrial network;

receive, from the network node and based at least in part on a type of orbit around Earth of the network node, a first value or the first value and a second value associated with a position of the network node relative to a terrestrial-based reference, wherein the first value and the second value are associated with a polar coordinate system, and wherein the first value corresponds to an azimuth angle and the second value corresponds to a zenith angle; and communicate with the network node based at least in part on the position of the network node relative to the terrestrial-based reference, wherein the position of the network node is based at least in part on an altitude of the network node, the first value, and the second value.

* * * * *